United States Patent
Sakhnini et al.

(10) Patent No.: US 11,671,994 B2
(45) Date of Patent: Jun. 6, 2023

(54) REUSING PDSCH TCI AND QCL FOR DYNAMIC CORESETS

(71) Applicant: QUALCOMM Incorporated, San Diego, CA (US)

(72) Inventors: Iyab Issam Sakhnini, San Diego, CA (US); Tao Luo, San Diego, CA (US); Qiang Wu, San Diego, CA (US); Jun Ma, San Diego, CA (US); Xiaoxia Zhang, San Diego, CA (US); Jing Sun, San Diego, CA (US); Juan Montojo, San Diego, CA (US); Peter Gaal, San Diego, CA (US); Mehmet Izzet Gurelli, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/225,916

(22) Filed: Apr. 8, 2021

(65) Prior Publication Data
US 2021/0321412 A1    Oct. 14, 2021

Related U.S. Application Data

(60) Provisional application No. 63/008,336, filed on Apr. 10, 2020.

(51) Int. Cl.
*H04W 76/27*        (2018.01)
*H04W 72/0453*      (2023.01)
(Continued)

(52) U.S. Cl.
CPC .......... *H04W 72/53* (2023.01); *H04L 5/0048* (2013.01); *H04W 72/0446* (2013.01);
(Continued)

(58) Field of Classification Search
None
See application file for complete search history.

(56) References Cited

U.S. PATENT DOCUMENTS 11,395,338 B2 *  7/2022  Ng .................... H04W 74/006
11,405,152 B2 *  8/2022  Khoshnevisan ...... H04L 5/0023
(Continued)

FOREIGN PATENT DOCUMENTS

EP        3547781 A1     10/2019
WO     2021066998 A1      4/2021

OTHER PUBLICATIONS

3GPP TSG RAN WG1 NR AH#3, Samsung, "On Beam Management, Measurement and Reporting." Nagoya, Japan, Sep. 18-21, 2017.*

(Continued)

*Primary Examiner* — Andrew C Oh
(74) *Attorney, Agent, or Firm* — Patterson+ Sheridan, L.L.P.

(57) ABSTRACT

Aspects of the present disclosure relate to wireless communications, and more particularly, to techniques for determining quasi co-location (QCL) and/or transmission configuration information (TCI) state assumption information for a dynamic control resource set (CORESET). In some cases, if certain conditions are met, a user equipment (UE) may follow QCL assumptions for a physical downlink shared channel (PDSCH) scheduled by a same PDCCH that indicated the dynamic CORESET. An example method by a UE generally includes receiving at least one downlink control information (DCI), of a first physical downlink control channel (PDCCH), that schedules at least one dynamic CORESET; and receiving a second PDCCH in the dynamic CORESET, wherein the UE is to apply at least one QCL
(Continued)

assumption associated with a PDSCH for the at least one dynamic CORESET if one or more conditions are met.

30 Claims, 14 Drawing Sheets

(51) Int. Cl.
*H04L 5/00* (2006.01)
*H04W 72/0446* (2023.01)
*H04W 72/23* (2023.01)
*H04W 72/50* (2023.01)
*H04W 72/53* (2023.01)

(52) U.S. Cl.
CPC ....... *H04W 72/0453* (2013.01); *H04W 72/23* (2023.01); *H04W 72/535* (2023.01); *H04W 76/27* (2018.02)

(56) References Cited

U.S. PATENT DOCUMENTS

| | | | | |
|---|---|---|---|---|
| 2018/0324843 | A1* | 11/2018 | Lee | H04W 48/12 |
| 2019/0045490 | A1* | 2/2019 | Davydov | H04L 5/0091 |
| 2019/0069285 | A1* | 2/2019 | Chandrasekhar | H04B 7/0695 |
| 2019/0082431 | A1* | 3/2019 | Yi | H04L 5/0053 |
| 2019/0132109 | A1* | 5/2019 | Zhou | H04L 5/0098 |
| 2019/0132862 | A1* | 5/2019 | Jeon | H04W 72/23 |
| 2019/0149380 | A1* | 5/2019 | Babaei | H04W 72/044 370/330 |
| 2019/0207737 | A1* | 7/2019 | Babaei | H04W 76/11 |
| 2019/0281587 | A1* | 9/2019 | Zhang | H04W 72/10 |
| 2019/0297637 | A1* | 9/2019 | Liou | H04W 72/1273 |
| 2019/0306765 | A1* | 10/2019 | Cirik | H04W 36/0058 |
| 2019/0342030 | A1* | 11/2019 | Hosseini | H04L 1/18 |
| 2019/0342907 | A1* | 11/2019 | Huang | H04L 5/0048 |
| 2019/0349964 | A1* | 11/2019 | Liou | H04W 72/046 |
| 2019/0373450 | A1* | 12/2019 | Zhou | H04W 76/11 |
| 2019/0379506 | A1* | 12/2019 | Cheng | H04W 80/02 |
| 2020/0029310 | A1 | 1/2020 | Lee et al. | |
| 2020/0053775 | A1* | 2/2020 | Lee | H04B 7/0617 |
| 2020/0053776 | A1* | 2/2020 | John Wilson | H04W 74/0808 |
| 2020/0059951 | A1* | 2/2020 | Frenne | H04W 72/1289 |
| 2020/0076559 | A1* | 3/2020 | Yoshimura | H04L 5/0053 |
| 2020/0100154 | A1* | 3/2020 | Cirik | H04W 36/0058 |
| 2020/0128585 | A1* | 4/2020 | Kuang | H04L 5/0094 |
| 2020/0145982 | A1* | 5/2020 | Cheng | H04W 72/044 |
| 2020/0146032 | A1* | 5/2020 | Bae | H04W 72/1268 |
| 2020/0187094 | A1* | 6/2020 | Horiuchi | H04L 5/0064 |
| 2020/0187236 | A1* | 6/2020 | Moon | H04L 5/0044 |
| 2020/0187239 | A1* | 6/2020 | Khoshnevisan | H04L 5/0053 |
| 2020/0196324 | A1* | 6/2020 | Ji | H04L 1/1614 |
| 2020/0205133 | A1* | 6/2020 | Takeda | H04L 5/0094 |
| 2020/0213989 | A1* | 7/2020 | Choi | H04L 5/0007 |
| 2020/0221485 | A1* | 7/2020 | Cirik | H04W 80/02 |
| 2020/0228190 | A1* | 7/2020 | Cirik | H04W 72/23 |
| 2020/0288479 | A1* | 9/2020 | Xi | H04W 72/23 |
| 2020/0295810 | A1* | 9/2020 | Baldemair | H04L 1/0073 |
| 2020/0328849 | A1* | 10/2020 | Noh | H04W 72/23 |
| 2020/0358586 | A1* | 11/2020 | Takeda | H04L 5/001 |
| 2021/0058133 | A1* | 2/2021 | Takeda | H04W 72/23 |
| 2021/0067268 | A1* | 3/2021 | Seo | H04L 25/0228 |
| 2021/0068138 | A1* | 3/2021 | Baldemair | H04L 1/12 |
| 2021/0127450 | A1* | 4/2021 | Abdoli | H04W 72/0453 |
| 2021/0143953 | A1* | 5/2021 | Parkvall | H04W 72/1273 |
| 2021/0144694 | A1* | 5/2021 | Lee | H04L 5/0055 |
| 2021/0153205 | A1* | 5/2021 | Takeda | H04L 5/0053 |
| 2021/0160880 | A1* | 5/2021 | Zhang | H04W 72/23 |
| 2021/0212031 | A1* | 7/2021 | Li | H04W 72/23 |
| 2021/0227558 | A1* | 7/2021 | Matsumura | H04W 72/0453 |
| 2021/0321406 | A1* | 10/2021 | Sakhnini | H04L 5/0078 |
| 2021/0385800 | A1* | 12/2021 | Harada | H04W 72/23 |
| 2021/0385826 | A1* | 12/2021 | Moon | H04L 1/0038 |
| 2021/0410170 | A1* | 12/2021 | Matsumura | H04L 5/0044 |
| 2022/0022207 | A1* | 1/2022 | Matsumura | H04W 72/23 |
| 2022/0053544 | A1* | 2/2022 | Kang | H04B 7/088 |
| 2022/0060293 | A1* | 2/2022 | Matsumura | H04L 1/1812 |
| 2022/0070895 | A1* | 3/2022 | Gao | H04L 1/1812 |
| 2022/0085938 | A1* | 3/2022 | Kang | H04L 5/0094 |
| 2022/0095338 | A1* | 3/2022 | Kim | H04L 5/0098 |
| 2022/0095367 | A1* | 3/2022 | Kim | H04W 74/0833 |
| 2022/0141857 | A1* | 5/2022 | Lee | H04W 72/0453 370/329 |
| 2022/0150011 | A1* | 5/2022 | Kim | H04L 1/0067 |
| 2022/0217647 | A1* | 7/2022 | Matsumura | H04W 52/146 |
| 2022/0217754 | A1* | 7/2022 | Matsumura | H04L 5/0053 |
| 2023/0011465 | A1* | 1/2023 | Matsumura | H04W 72/23 |

OTHER PUBLICATIONS

International Search Report and Written Opinion—PCT/US2021/026684—ISA/EPO—dated Aug. 3, 2021.
LG Electronics: "Considerations on Power Saving for NR", 3GPP TSG RAN WG1 Ah-Hoc Meeting 1901, 3GPP Draft R1-1900602, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), 5 Pages, XP051593449.
Qualcomm Incorporated: "PDCCH-Based Power Saving Channel Design", 3GPP Draft, 3GPP TSG-RAN WG1 #97, R1-1907294, PDCCH-based Power Saving Channel Design, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728734, 16 Pages.
Samsung: "On Beam Management, Measurement and Reporting", 3GPP Draft, 3GPP TSG RAN WG1 NR AH#3, R1-1715940, 3rd Generation Partnership Project (3GPP), Mobile Competence Centre, 650, Route Des Lucioles, F-06921, Sophia-Antipolis Cedex, France, vol. RAN WG1, No. Nagoya, Japan, Sep. 18, 2017-Sep. 21, 2017, Sep. 17, 2017 (Sep. 17, 2017), 16 Pages, XP051339399.

* cited by examiner

REUSING PDSCH TCI AND QCL FOR DYNAMIC CORESETS

PRIORITY CLAIM(S)

This application claims benefit of the priority to U.S. Provisional Application No. 63/008,336, filed on Apr. 10, 2020, which is expressly incorporated by reference in its entirety as if fully set forth below and for all applicable purposes.

INTRODUCTION

Aspects of the present disclosure relate to wireless communications, and more particularly, to techniques for determining quasi co-location (QCL) assumptions for control resource sets (CORESETS).

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes receiving at least one downlink control information (DCI), of a first physical downlink control channel (PDCCH), that schedules at least one dynamic control resource set (CORESET); and receiving a second PDCCH in the dynamic CORESET, wherein the UE is to apply at least one quasi-co-located (QCL) assumption associated with a physical downlink shared channel (PDSCH) for the at least one dynamic CORESET if one or more conditions are met.

Certain aspects of the present disclosure are directed to an apparatus for wireless communication by a UE. The apparatus generally includes a memory and at least one processor coupled to the memory, the memory and the at least one processor being configured to receive at least one DCI, of a first PDCCH, that schedules at least one dynamic CORESET; and receive a second PDCCH in the dynamic CORESET, wherein the UE is to apply at least one QCL assumption associated with a PDSCH for the at least one dynamic CORESET if one or more conditions are met.

Certain aspects of the present disclosure are directed to an apparatus for wireless communication by a UE. The apparatus generally includes means for receiving at least one DCI, of a first PDCCH, that schedules at least one dynamic CORESET; and means for receiving a second PDCCH in the dynamic CORESET, wherein the UE is to apply at least one QCL assumption associated with a PDSCH for the at least one dynamic CORESET if one or more conditions are met.

Certain aspects of the present disclosure are directed to a computer readable medium having instructions stored thereon for receiving at least one DCI, of a first PDCCH, that schedules at least one dynamic CORESET; and receiving a second PDCCH in the dynamic CORESET, wherein the UE is to apply at least one QCL assumption associated with a PDSCH for the at least one dynamic CORESET if one or more conditions are met.

Certain aspects of the present disclosure provide a method for wireless communications by a network entity. The method generally includes transmitting a UE at least one DCI, of a first PDCCH, that schedules at least one dynamic CORESET; and transmitting a second PDCCH in the dynamic CORESET, wherein the UE is to apply at least one QCL assumption for a PDSCH for the at least one dynamic CORESET if one or more conditions are met.

Certain aspects of the present disclosure are directed to an apparatus for wireless communication by a network entity. The apparatus generally includes a memory and at least one processor coupled to the memory, the memory and the at least one processor being configured to transmit a UE at least one DCI, of a first PDCCH, that schedules at least one dynamic CORESET; and transmit a second PDCCH in the dynamic CORESET, wherein the UE is to apply at least one QCL assumption for a PDSCH for the at least one dynamic CORESET if one or more conditions are met.

Certain aspects of the present disclosure are directed to an apparatus for wireless communication by a network entity. The apparatus generally includes means for transmitting a UE at least one DCI, of a first PDCCH, that schedules at least one dynamic CORESET; and means for transmitting a second PDCCH in the dynamic CORESET, wherein the UE is to apply at least one QCL assumption for a PDSCH for the at least one dynamic CORESET if one or more conditions are met.

Certain aspects of the present disclosure are directed to a computer readable medium having instructions stored thereon for transmitting a UE at least one DCI, of a first PDCCH, that schedules at least one dynamic CORESET; and transmitting a second PDCCH in the dynamic CORESET, wherein the UE is to apply at least one QCL assumption for a PDSCH for the at least one dynamic CORESET if one or more conditions are met.

Certain aspects of the present disclosure provide a method for wireless communications by a UE. The method generally includes detecting at least one DCI that schedules at least one dynamic CORESET, determining the UE is to apply at least one QCL assumption associated with a PDSCH for the at least one dynamic CORESET if one or more conditions are met, wherein the PDSCH and dynamic CORESET overlap in time, are scheduled by the same DCI, or both overlap in time and are scheduled by the same DCI, and monitoring the dynamic CORESET for a PDCCH in accordance with the determination.

Certain aspects of the present disclosure are directed to an apparatus for wireless communication by a UE. The apparatus generally includes a memory and at least one processor coupled to the memory, the memory and the at least one processor being configured to detect at least one DCI that schedules at least one dynamic CORESET, determine the UE is to apply at least one QCL assumption associated with a PDSCH for the at least one dynamic CORESET if one or more conditions are met, wherein the PDSCH and dynamic CORESET overlap in time, are scheduled by the same DCI, or both overlap in time and are scheduled by the same DCI, and monitor the dynamic CORESET for a PDCCH in accordance with the determination.

Certain aspects of the present disclosure are directed to an apparatus for wireless communication by a UE. The apparatus generally includes means for detecting at least one DCI that schedules at least one dynamic CORESET, means for determining the UE is to apply at least one QCL assumption associated with a PDSCH for the at least one dynamic CORESET if one or more conditions are met, wherein the PDSCH and dynamic CORESET overlap in time, are scheduled by the same DCI, or both overlap in time and are scheduled by the same DCI, and means for monitoring the dynamic CORESET for a PDCCH in accordance with the determination.

Certain aspects of the present disclosure are directed to a computer readable medium having instructions stored thereon for detecting at least one DCI that schedules at least one dynamic CORESET, determining the UE is to apply at least one QCL assumption associated with a PDSCH for the at least one dynamic CORESET if one or more conditions are met, wherein the PDSCH and dynamic CORESET overlap in time, are scheduled by the same DCI, or both overlap in time and are scheduled by the same DCI, and monitoring the dynamic CORESET for a PDCCH in accordance with the determination.

Certain aspects of the present disclosure provide a method for wireless communications by a network entity. The method generally includes transmitting a UE at least one DCI, of a first PDCCH, that schedules at least one dynamic CORESET; and transmitting a second PDCCH in the dynamic CORESET, wherein the UE is to apply at least one QCL assumption for a PDSCH for the at least one dynamic CORESET if one or more conditions are met.

Certain aspects of the present disclosure are directed to an apparatus for wireless communication by a network entity. The apparatus generally includes a memory and at least one processor coupled to the memory, the memory and the at least one processor being configured to transmit a UE at least one DCI, of a first PDCCH, that schedules at least one dynamic CORESET; and transmit a second PDCCH in the dynamic CORESET, wherein the UE is to apply at least one QCL assumption for a PDSCH for the at least one dynamic CORESET if one or more conditions are met.

Certain aspects of the present disclosure are directed to an apparatus for wireless communication by a network entity. The apparatus generally includes means for transmitting a UE at least one DCI, of a first PDCCH, that schedules at least one dynamic CORESET; and means for transmitting a second PDCCH in the dynamic CORESET, wherein the UE is to apply at least one QCL assumption for a PDSCH for the at least one dynamic CORESET if one or more conditions are met.

Certain aspects of the present disclosure are directed to a computer readable medium having instructions stored thereon for transmitting a UE at least one DCI, of a first PDCCH, that schedules at least one dynamic CORESET; and transmitting a second PDCCH in the dynamic CORESET, wherein the UE is to apply at least one QCL assumption for a PDSCH for the at least one dynamic CORESET if one or more conditions are met.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
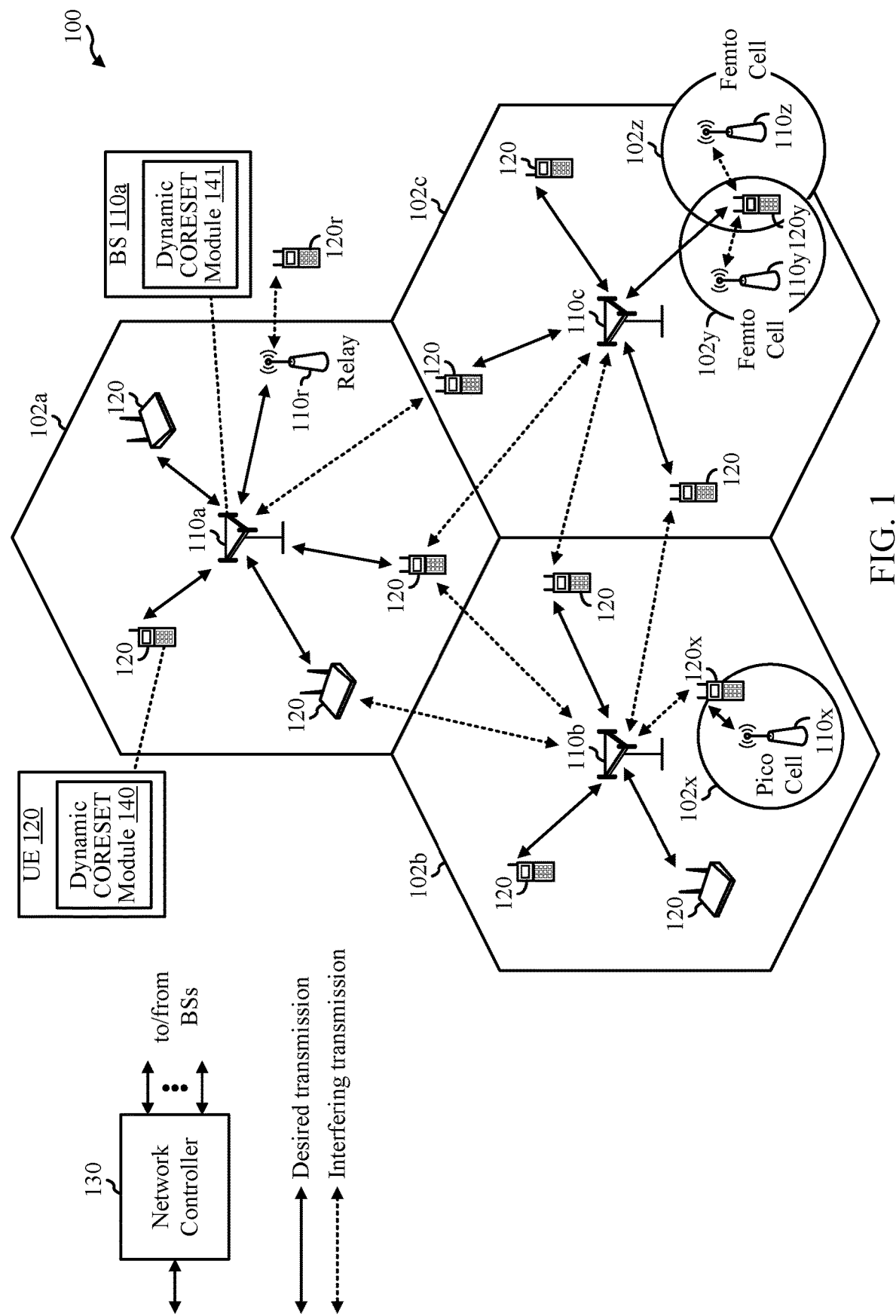
FIG. 1 is a block diagram conceptually illustrating an example telecommunications system, in accordance with certain aspects of the present disclosure.

Aspects of the present disclosure provide apparatus, devices, methods, processing systems, and computer readable mediums for determining quasi-co-located (QCL) assumptions for a dynamic control resource set (CORESET).

As will be described in greater detail below, in some cases a UE may be able to follow QCL assumptions for a physical downlink shared channel (PDSCH) when monitoring a dynamic CORESET, if one or more conditions are met. For example, the UE may be able to reuse a same transmission configuration indicator (TCI) state as the PDSCH, if the PDSCH and dynamic CORESET are scheduled by a same PDCCH. As another example, the UE may be able to reuse the same transmission configuration indicator (TCI) state as the PDSCH if the PDSCH and dynamic CORESET overlap in time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a UE 120 configured with a dynamic CORESET manager 140 to perform operations 800 of FIG. 8 to determine quasi co-location (QCL) assumptions for dynamic control resource sets (CORESETs). Similarly, the wireless network 100 may include a base station 110 (e.g., base station 110a) configured with a dynamic CORESET manager 141 to perform operations 900 of FIG. 9 to determine QCL assumptions for dynamic CORESETs.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. In one example, a quadcopter, drone, or any other unmanned aerial vehicle (UAV) or remotely piloted aerial system (RPAS) 120d may be configured to function as a UE. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
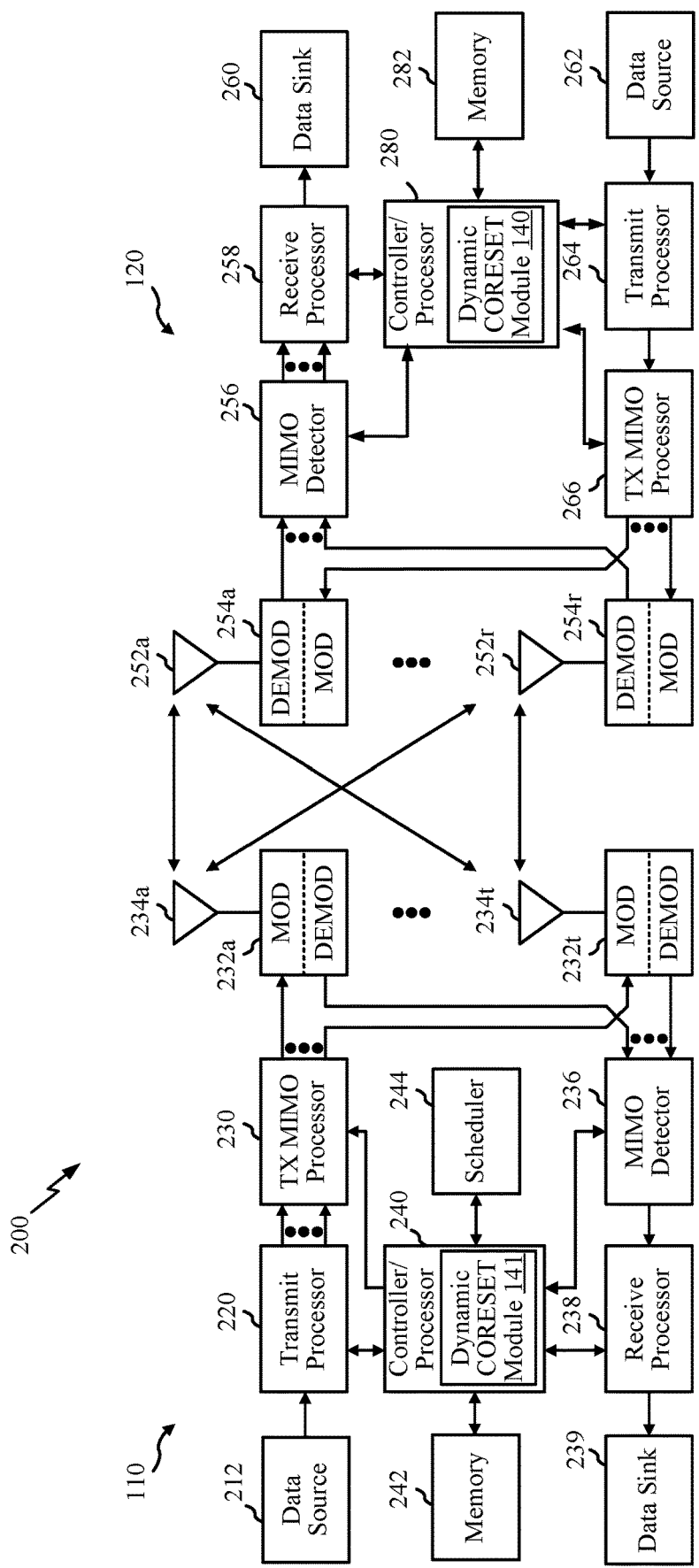
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 may be used to perform operations 800 of FIG. 8, while antennas 234, processors 220, 260, 238, and/or controller/processor 240 of the BS 110 may be used to perform operations 900 of FIG. 9.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, antennas 252a through 252r may receive downlink signals from the base station 110 and may provide received signals to demodulators (DEMODs) in transceivers 254a through 254r, respectively. Each demodulator 254 may condition (e.g., filter, amplify, down convert, and digitize) a respective received signal to obtain input samples. Each demodulator may further process input samples (e.g., for OFDM, etc.) to obtain received symbols. A MIMO detector 256 may obtain received symbols from all demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the BS 110, uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct operations at the base station 110 and the UE 120, respectively. The processor 240 and/or other processors and modules at the BS 110 may perform or direct execution of processes for techniques described herein. The memories 242 and 282 may store data and program codes for BS 110 and UE 120, respectively. A scheduler 244 may schedule UEs for data transmission on the downlink and/or uplink.

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 3:
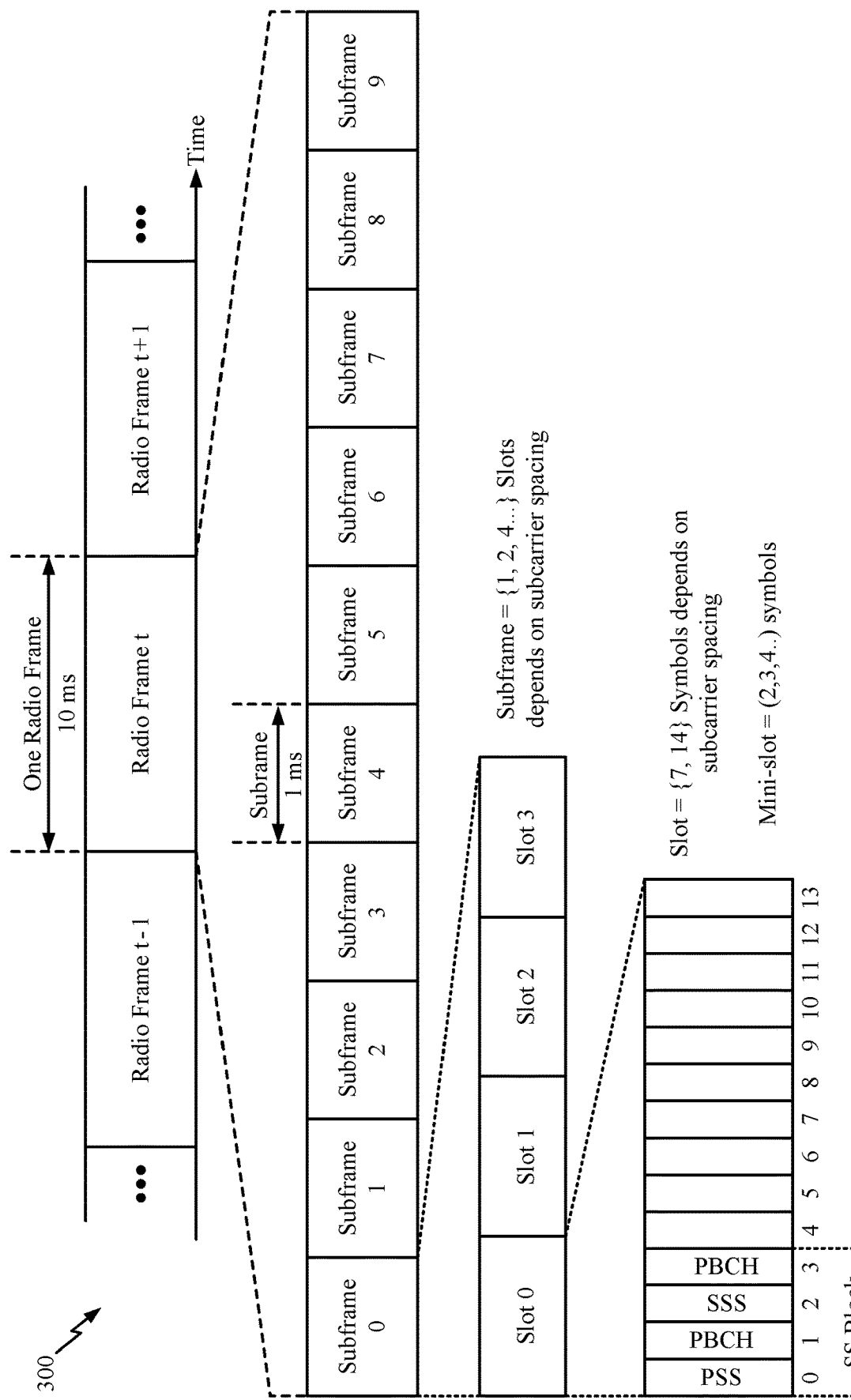
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Figure 4:
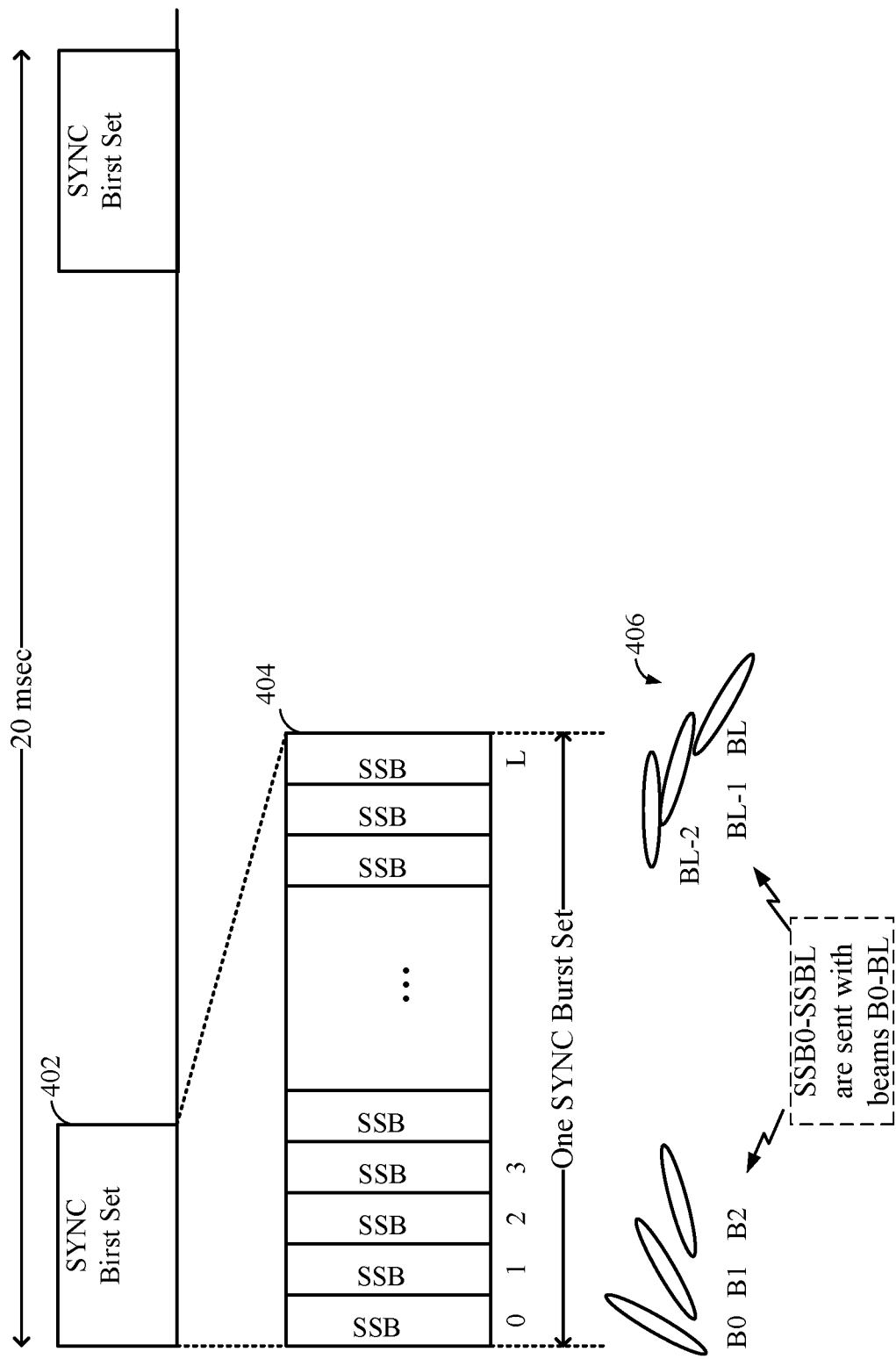
FIG. 4 illustrates how different synchronization signal blocks (SSBs) may be sent using different beams, in accordance with certain aspects of the present disclosure.

As shown in FIG. 4, the SS blocks (SSBs) 404 may be organized into SS burst sets 402 to support beam sweeping. As shown, each SSB 404 within a burst set 402 of L SSBs may be transmitted using a different beam 406 (e.g., beams B0-BL), which may help a UE quickly acquire both transmit (Tx) and receive (Rx) beams (particular for mmW applications). A physical cell identity (PCI) may still decoded from the PSS and SSS of the SSB 404.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Control Resource Sets (CORESETs)

A control resource set (CORESET) for an orthogonal frequency division multiple access (OFDMA) system (e.g., a communications system transmitting physical downlink control channel (PDCCH) using OFDMA waveforms) may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. Search spaces are generally areas or portions of the CORESET where a communication device (e.g., a UE) may look for control information.

According to aspects of the present disclosure, a CORESET is a set of time and frequency domain resources, defined in units of resource element (RE) groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit PDCCHs (e.g., new radio (NR) PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Operating characteristics of a NodeB or other base station in a communications system (e.g., a NR communications system) may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitor the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

According to aspects of the present disclosure, when a UE is connected to a cell (or BS), the UE may receive a master information block (MIB). In one example, the MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and SCS. In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 5:
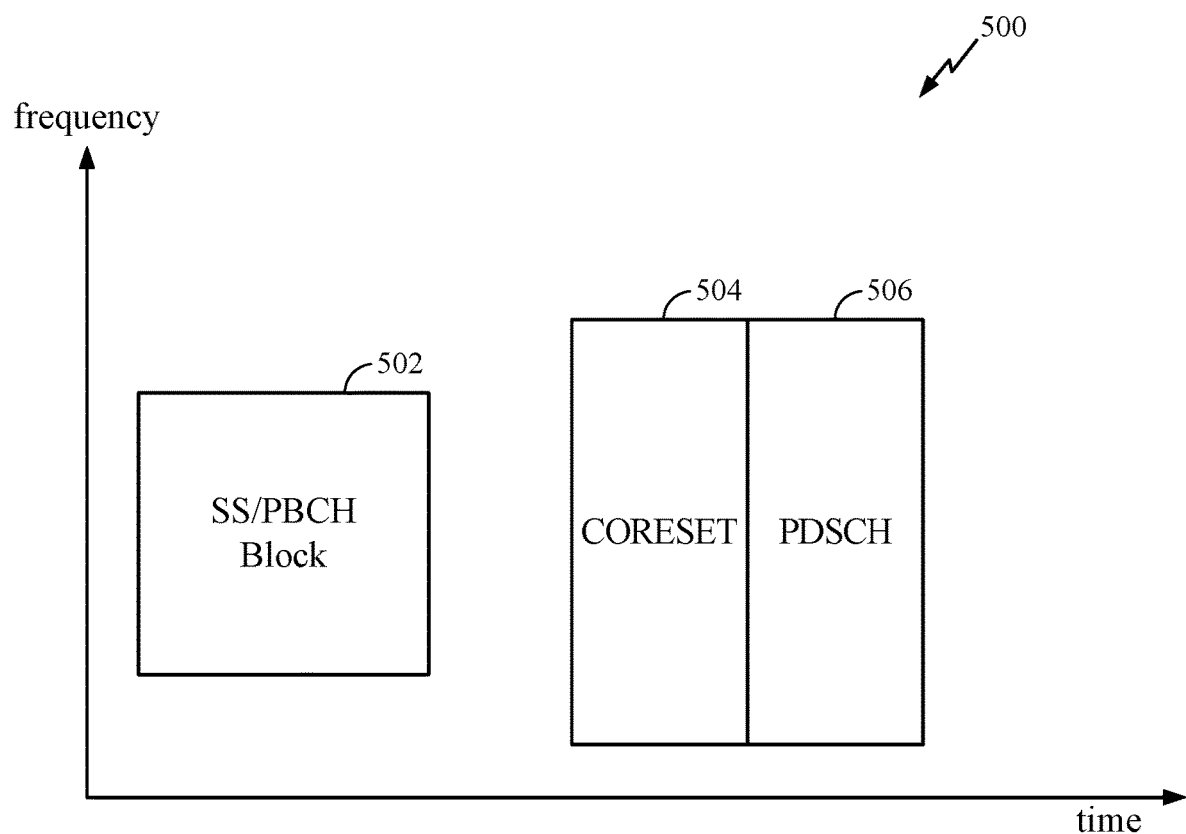
FIG. 5 shows an exemplary transmission resource mapping, according to aspects of the present disclosure.

FIG. 5 shows an exemplary transmission resource mapping 500, according to aspects of the present disclosure. In the exemplary mapping, a BS (e.g., BS 110a, shown in FIG. 1) transmits an SS/PBCH block 502. The SS/PBCH block includes a MIB conveying an index to a table that relates the time and frequency resources of the CORESET 504 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 506. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

QCL Port and TCI States

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (e.g., gNB) for scheduling, link adaptation, and/or beam management purposes. Currently (e.g., in new radio NR), the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the downlink (DL) reference signals (RSs) in one CSI-RS set and the PDSCH demodulation reference signal (DMRS) ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. Each configured TCI state may include one RS set TCI-RS-SetConfig that indicates different QCL assumptions between certain source and target signals.

Figure 6:
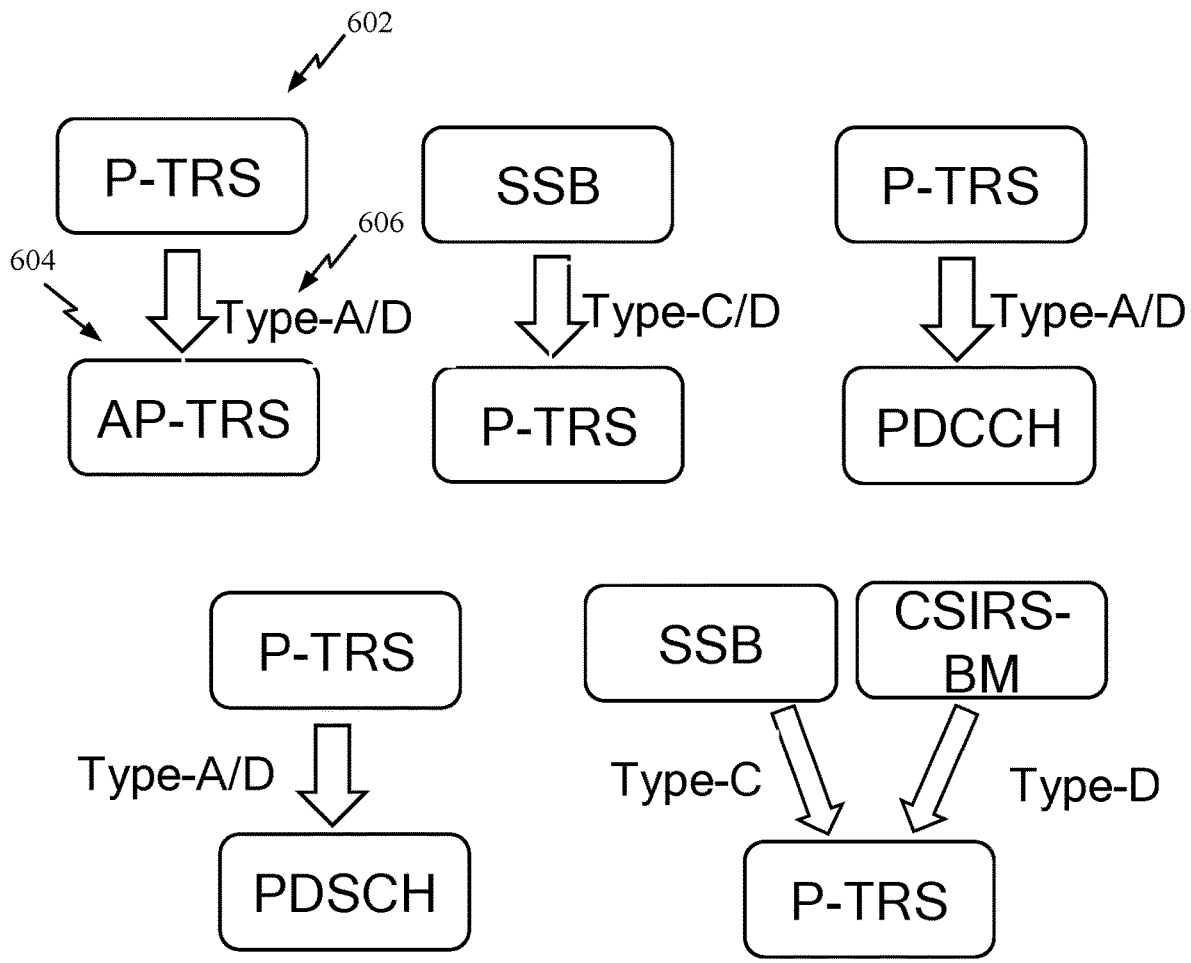
FIG. 6 illustrates example quasi co-location (QCL) relationships, in accordance with certain aspects of the present disclosure.

FIG. 6 illustrate examples of the association of DL reference signals (602, 604) with corresponding QCL types 606 that may be indicated by a TCI-RS-SetConfig.

In the examples of FIG. 6, a source RS 602 is indicated in the top block and is associated with a target signal 604 indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS type: PUSCH DMRS, CSIRS, TRS, and SRS.

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated QCL Type for each one configured by the higher layer parameter QCL-Type.

As illustrated in FIG. 6, for the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL for P-TRS.

QCL information and/or types may in some scenarios depend on or be a function of other information. For example, the QCL types indicated to the UE can be based on higher layer parameter QCL-Type and may take one or a combination of the following types:

QCL-TypeA: {Doppler shift, Doppler spread, average delay, delay spread},

QCL-TypeB: {Doppler shift, Doppler spread},

QCL-TypeC: {average delay, Doppler shift}, and

QCL-TypeD: {Spatial Rx parameter},

Spatial QCL assumptions (e.g., QCL-TypeD) may be used to help a UE to select an analog reception (Rx) beam (e.g., during beam management procedures). For example, an SSB resource indicator may indicate a same beam for a previous reference signal should be used for a subsequent transmission.

An initial CORESET (e.g., CORESET ID 0 or simply CORESET #0) in NR may be identified during initial access by a UE (e.g., via a field in the MIB). A ControlResourceSet information element (CORESET IE) sent via radio resource control (RRC) signaling may convey information regarding a CORESET configured for a UE. The CORESET IE generally includes a CORESET ID, an indication of frequency domain resources (e.g., number of RBs) assigned to the CORESET, contiguous time duration of the CORESET in a number of symbols, and Transmission Configuration Indicator (TCI) states.

As noted above, a subset of the TCI states provide quasi co-location (QCL) relationships between DL RS(s) in one RS set (e.g., TCI-Set) and PDCCH demodulation RS (DMRS) ports. A particular TCI state for a given UE (e.g., for unicast PDCCH) may be conveyed to the UE by the Medium Access Control (MAC) Control Element (MAC-CE). The particular TCI state is generally selected from the set of TCI states conveyed by the CORESET IE, with the initial CORESET (CORESET #0) generally configured via MIB.

Search space information may also be provided via RRC signaling. For example, the SearchSpace IE is another RRC IE that defines how and where to search for PDCCH candidates for a given CORESET. Each search space is associated with one CORESET. The SearchSpace IE identifies a search space configured for a CORESET by a search space ID. In an aspect, the search space ID associated with CORESET #0 is SearchSpace ID #0. The search space is generally configured via PBCH (MIB).

Example Dynamic CORESETS

Aspects of the present disclosure provide apparatus, methods, processing systems, and computer readable mediums for processing and signaling dynamic control channel resources. As will be described, the techniques presented herein may allow for the use of more sparse "regular" periodic control channel resources, allowing a UE to conserve power by staying in a low power state longer (e.g., unless dynamic control channel resources are indicated in the regular control channel resources). The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations—FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band In certain applications, a UE may be designed to support a limited number of NR features (also referred to as NR Light or NR Lite), for example, to keep costs low. Due to limited device capability in such applications, a UE may not be able to monitor PDCCH in every slot.

In FR4 or NR Lite applications, control channel resource can be sparsely configured (e.g., occurring with a relatively low periodicity). Sparse control channel monitoring by the UE may alleviate the issues described above and provide a power saving gain. For example, a PDCCH monitoring periodicity (e.g., by search space periodicity configuration in NR) can be very large (e.g., much greater than 1 slots) in FR4.

Unfortunately, sparse control channel resources may limit scheduling flexibility and increase latency. Dynamic configuration and indication of additional control channel resource proposed herein may help avoid these drawbacks of sparse control channel resources. In some cases, a network entity (e.g., a gNB) may dynamically indicate additional control channel resources in certain conditions, for example, to accommodate an increase (burst) of traffic targeting a particular UE.

Figure 7:
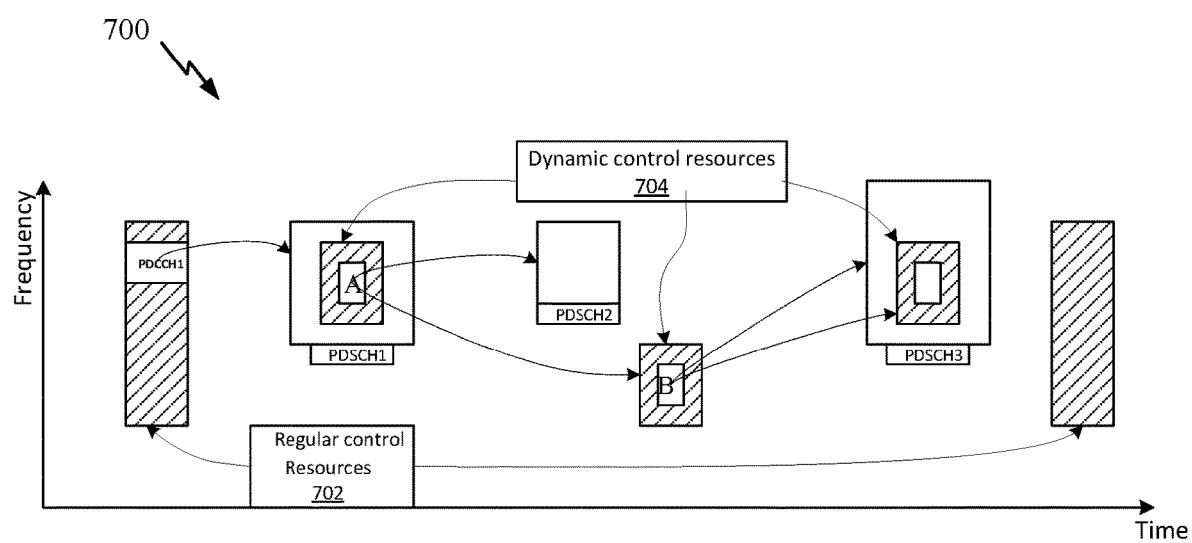
FIG. 7 illustrates an example timing diagram for dynamic control resource signaling, in accordance with some aspects of the present disclosure

As illustrated in the example diagram 700 FIG. 7, dynamic control channel resources 704 may be indicated by dynamic signaling, for example, via a PDCCH in regular (sparse/periodic) control channel resource 702 carrying downlink control information (DCI) or layer 1 (L1) signaling. Unlike regular control channel resources 702, the dynamic resources 704 are non-recurring (e.g., aperiodic) and may be for one-shot (or a limited number of) monitoring occasions.

In some cases, the network (e.g., a gNB) may configure a UE with different options for sets of dynamic control channel resources. Based on the configuration and an indication, the UE can monitor control channels (e.g., PDCCH) within the dynamic control channel resources.

As illustrated in FIG. 7, dynamic control channel resources provided between sparse regular control channel monitoring occasions, provides additional opportunities for control channel transmissions. As shown, the dynamic resources may be nested within resources for a PDSCH scheduled by the PDCCH. As will be described below, in some cases, the dynamic resources may be offset in frequency from the scheduled PDSCH to avoid a collision.

As illustrated, in some cases a PDCCH/DCI sent in dynamic control signal resources may indicate still additional dynamic control channel resources (which creates a chain). In some cases, if such a chain expands beyond a regular control channel resource, the UE may skip monitoring the regular control channel resource.

There are various options for how dynamic control channel resources may be triggered. For example, in some cases, one or more sets of dynamic control channel resources may be indicated simultaneously. For example, PDCCH can be used for signaling the dynamic control channel resources. As illustrated, the PDCCH may be transmitted either in the regular control channel resources or in other dynamic control channel resources.

In some cases, the PDCCH may be a UE-specific PDCCH for DL/UL scheduling and/or a non-scheduling group-common PDCCH (e.g., with no grant). In some cases, a DCI carried by the PDCCH may have one or more additional fields for indicating the dynamic resources can be added in the DCI. In other cases, a single field in the DCI may trigger multiple sets of dynamic resources jointly. In other cases, multiple separate fields may be used, each triggering a different set.

In some cases, a network entity may configure a UE with a list of one or more sets of dynamic control channel resources (e.g., by RRC signaling). In such cases, a triggering field in the DCI may include an index in the list.

In such cases, the configuration may include various parameters, such as: time/frequency resources, a resource mapping type (e.g., interleaved or localized), precoding, beam (e.g., QCL/TCI state), aggregation level, and/or a number of PDCCH candidates.

For joint triggering of multiple dynamic control channel resource sets, a combination of more than one sets of resources can be associated with a single entry in the list.

In some cases, instead of pre-configuration (some or all of the dynamic control channel resource parameters), some parameters related to the dynamic resources may be determined at the moment of triggering. For example, when the dynamic resources are triggered by a DL scheduling DCI, the TCI state for the dynamic resources may be determined by the TCI state of the scheduled PDSCH (which may be particular appropriate when there is an overlap of resources).

Alternatively, at least one of the regular control channel resources can be indicated to the UE and the UE may determine dynamic control channel resources based on this regular configuration. In such cases, the same resource configuration as the regular control channel resources may be applied to the dynamic resources with some modification. For example, the periodicity configuration of the regular control channel may be ignored and the timing may be determined by an offset relative to the triggering DCI. As noted above, in some cases, a frequency shift (e.g., relative to the co-scheduled PDSCH) may be applied to avoid resource collision. In some cases, the dynamic indication may tell the UE to skip (avoid monitoring for PDCCH in) one or more regular control channel resources.

TCI/QCL Determination for Dynamic CORESETS

As noted above, certain assumptions, such as quasi-co-located (QCL) assumptions, may help a user equipment (UE) process downlink transmissions. Aspects of the present disclosure provide techniques for determining QCL assumptions (relationships) for dynamic CORESETs, for example, based on QCL relationships and transmission configuration information (TCI) states. For example, the techniques may allow the UE to know which reference signals it can use to estimate the channel in order to decode a transmitted signal (e.g., PDCCH) in a dynamic CORESET. As noted above, the concept of quasi co-location (QCL) and transmission configuration indicator (TCI) states is used to convey information about these assumptions.

Further, while the techniques described herein may be applicable to new radio (NR) technologies, it should be appreciated that the techniques of the present disclosure may be implemented in any suitable technology.

A first approach to determine the QCL/TCI for the dynamic CORESETs may leverage QCL/TCI state determination mechanisms for regular CORESETs.

According to a second approach, TCI states for dynamic CORESETs may be dynamically indicated, for example, similar to how TCI states are dynamically indicated for PDSCH, but separately. This approach may improve flexibility and may allow for refined beams.

According to a third approach, if PDSCH and dynamic CORESETs are co-scheduled (e.g., by the same DCI), dynamic CORESETs may be able to reuse the same TCI state indication as used for (the co-scheduled) physical downlink shared channel (PDSCH). This approach may enable use of a refined beam for dynamic CORESETs. In some cases, some combination of two or more of these various approach may be used.

Figure 8:
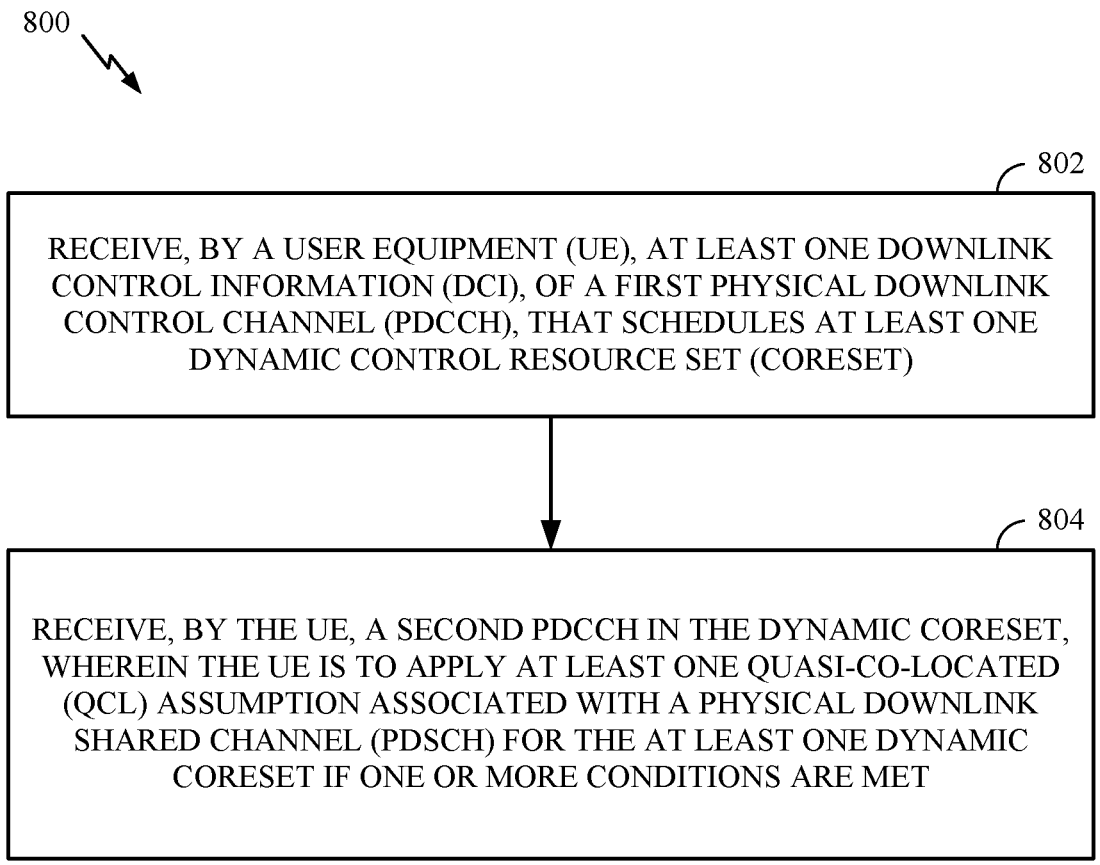
FIG. 8 illustrates example operations for wireless communications by a user equipment (UE), in accordance with certain aspects of the present disclosure.
Figure 9:
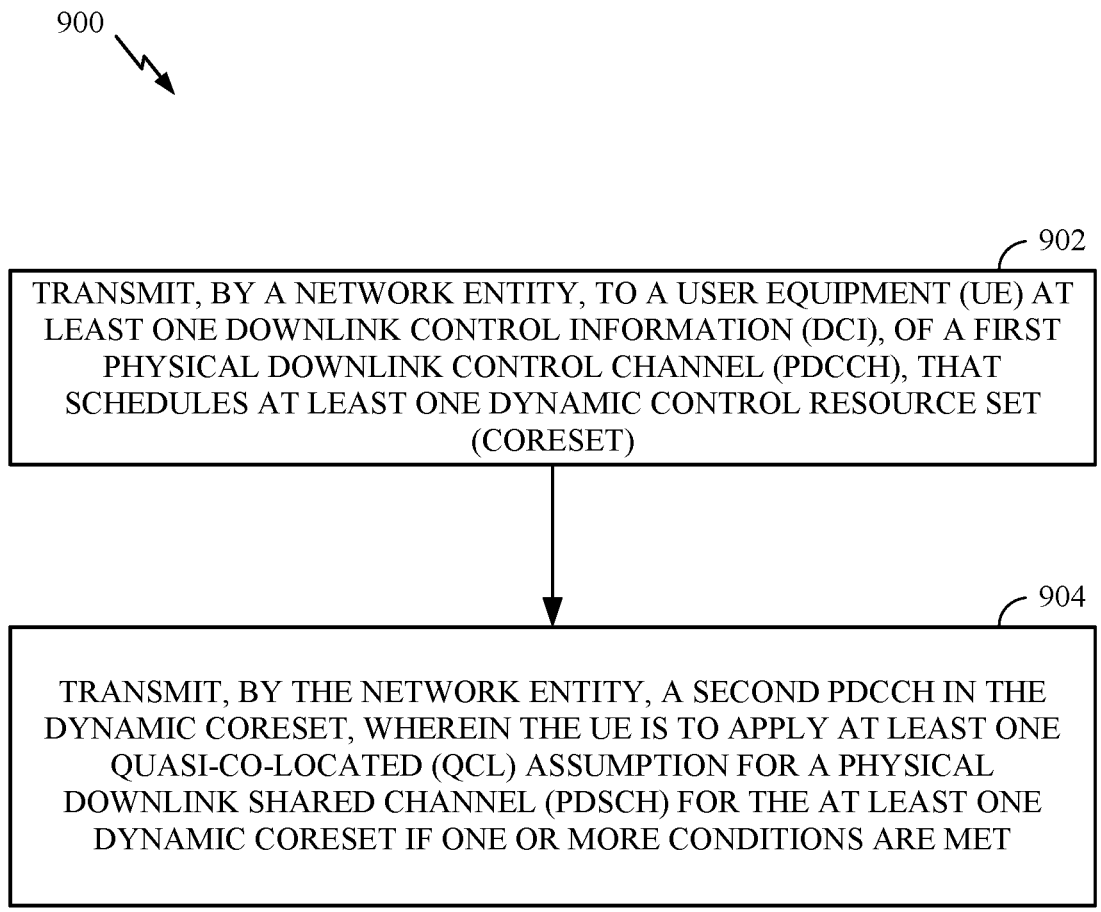
FIG. 9 illustrates example operations for wireless communications by a network entity, in accordance with certain aspects of the present disclosure.

FIGS. 8 and 9 illustrate example operations that may be performed by a UE and network entity, respectively, for determining QCL assumptions for dynamic CORESETs according to the third approach.

FIG. 8 illustrates example operations 800 for wireless communications by a UE, in accordance with certain aspects of the present disclosure. For example, operations 800 may be performed by a UE 120 of FIG. 1 to determine QCL assumptions for dynamic CORESETs.

Operations 800 begin, at 802, by receiving at least one DCI, of a first PDCCH, that schedules at least one dynamic CORESET. For example, referring back to FIG. 7, a first PDCCH (e.g., PDCCH1) in a regular (sparse) CORESET 702 can indicate one or more dynamic CORESETs 704. The dynamic CORESETs could be nested in PDSCH regions or standalone and could indicate other dynamic CORESETs. In the case where a single PDCCH indicates the dynamic CORESET and schedules a PDSCH, the PDSCH and dynamic CORESET are referred to herein as "co-scheduled." In certain aspects, the UE determines the UE is to apply at least one QCL assumption associated with a PDSCH for the at least one dynamic CORESET if one or more conditions are met, wherein the PDSCH and dynamic CORESET overlap in time, are scheduled by the same DCI, or both overlap in time and are scheduled by the same DCI. As will be described in greater detail below, in case the UE is not provided with a TCI state configuration or does not receive an activation command in sufficient time to apply to the dynamic CORESET, in some cases, the UE may reuse the TCI/QCL assumptions for the PDSCH co-scheduled with the dynamic CORESET.

At 804, the UE receives a second PDCCH in the dynamic CORESET, wherein the UE is to apply at least one QCL assumption associated with a physical downlink shared channel (PDSCH) for the at least one dynamic CORESET if one or more conditions are met. In certain aspects, the UE monitors the dynamic CORESET for the PDCCH in accordance with the determination. For example, the UE may monitor the dynamic CORESET using QCL/TCI assumptions of the co-scheduled PDSCH, if applicable.

FIG. 9 illustrates example operations 900 for wireless communications by a network entity and may be considered complementary to operations 800 of FIG. 8 and may be considered complementary to operations 700 of FIG. 7. For example, operations 900 may be performed by a gNB scheduling transmissions to a UE 120 performing operations 800 of FIG. 8.

Operations 900 begin, at 902, by sending a UE at least one DCI, of a first PDCCH, that schedules at least one dynamic CORESET. In some cases, the network entity may determine that the UE is to apply at least one QCL assumption for a PDSCH for the at least one dynamic CORESET if one or more conditions are met, where the PDSCH and dynamic CORESET overlap in time, are scheduled by the same DCI, or both overlap in time and are scheduled by the same DCI.

At 904, the network entity transmits a second PDCCH in the dynamic CORESET, wherein the UE is to apply at least one QCL assumption for a physical downlink shared channel (PDSCH) for the at least one dynamic CORESET if one or more conditions are met.

In some cases, the network may indicate to the UE (e.g., in the dynamic CORESET RRC configuration or in the DCI scheduling the dynamic CORESET) if the dynamic CORESET TCI should follow the PDSCH TCI, for example, if the offset between DCI and dynamic CORESET is greater than or equal to a parameter timeDurationForQCL. The parameter timeDurationForQCL generally represents a parameter designed to give the UE sufficient time to apply the QCL (e.g., and may be based on UE capability and/or SCS of the dynamic CORESET.

Signaling of the indication of whether the UE should follow (e.g., reuse) the PDSCH TCI for the dynamic CORESET can be explicit or implicit. As an example of implicit signaling, the network may implicitly indicate the UE should reuse the PDSCH TCI for the dynamic CORESET if it does not configure TCI states for the dynamic CORESET.

In some cases, the UE may reuse PDSCH TCI if the dynamic CORESET is scheduled by the same DCI as the PDSCH and the DCI has the TCI field present, if the time offset between the DCI and the dynamic CORESET is greater than or equal to timeDurationForQCL. In such cases, for the PDCCH DMRS on the dynamic CORESET, the UE may use the same TCI state indicated by the TCI field of the DCI. In other words, in this case, when monitoring the dynamic CORESET, the UE follows the same TCI state for the scheduled PDSCH.

In some cases, when processing PDCCH in the dynamic CORESET, the UE may follow the same TCI state for the scheduled PDSCH if the PDSCH and dynamic CORESET overlap fully or partially in time.

In some cases, there may be multiple TCI states indicated for a PDSCH co-scheduled with a dynamic CORESET. In such cases, if the UE is to follow the PDSCH TCI state when processing PDCCH in the dynamic CORESET, it may need to decide which of the multiple TCI states to use.

If 2 TCI states for a time division multiplexed (TDM) PDSCH scheme are configured, in one case, if the dynamic CORESET and PDSCH overlap in time, the UE may process the dynamic CORESET using one of the PDSCH TCIs used for the overlapping portion of the PDSCH occasion. In another case, if the dynamic CORESET and PDSCH do not overlap in time, the UE may process the dynamic CORESET using one of the multiple indicated TCIs for PDSCH, for example, selected based on signaling or some specified rule.

If 2 TCI states for a frequency division multiplexed (FDM) PDSCH scheme (e.g., FDMSchemeA or FDMSchemeB) are configured, the UE may process the dynamic CORESET using one of the multiple indicated TCIs for PDSCH, for example, selected based on signaling or some specified rule.

In some cases, the UE may be able to reuse PDSCH QCL assumptions, regardless of the time offset between the DCI (that co-schedules the PDSCH and dynamic CORESET) and the dynamic CORESET. For example, while spatial QCL (e.g., QCL-TypeD) assumptions may require significant time to apply (e.g., to update beamformer settings), other QCL assumptions may not. Therefore, in some cases, if none of the configured TCI states for scheduled PDSCH contains QCL-TypeD' information, the UE may re-use other QCL assumptions from the indicated TCI states for its scheduled PDSCH.

In some cases, TCI may not be enabled in the DCI, the DCI may come before reception of an activation command for a PDSCH TCI, the DCI may not have a TCI field present, or the UE may not have sufficient time to apply a TCI state indicated in the DCI (e.g., if a time offset between the DCI and the dynamic CORESET is less than a timeDurationForQCL).

In such cases (e.g., before the UE is signaled TCI states, before the UE receives signaling activating a TCI state, or before the UE is signaled an active TCI state with sufficient time to apply for monitoring the dynamic CORESET for at least a second PDCCH), the QCL assumption for the dynamic CORESET may be determined according to various options. The various options may be understood with reference to FIG. 10.

Figure 10:
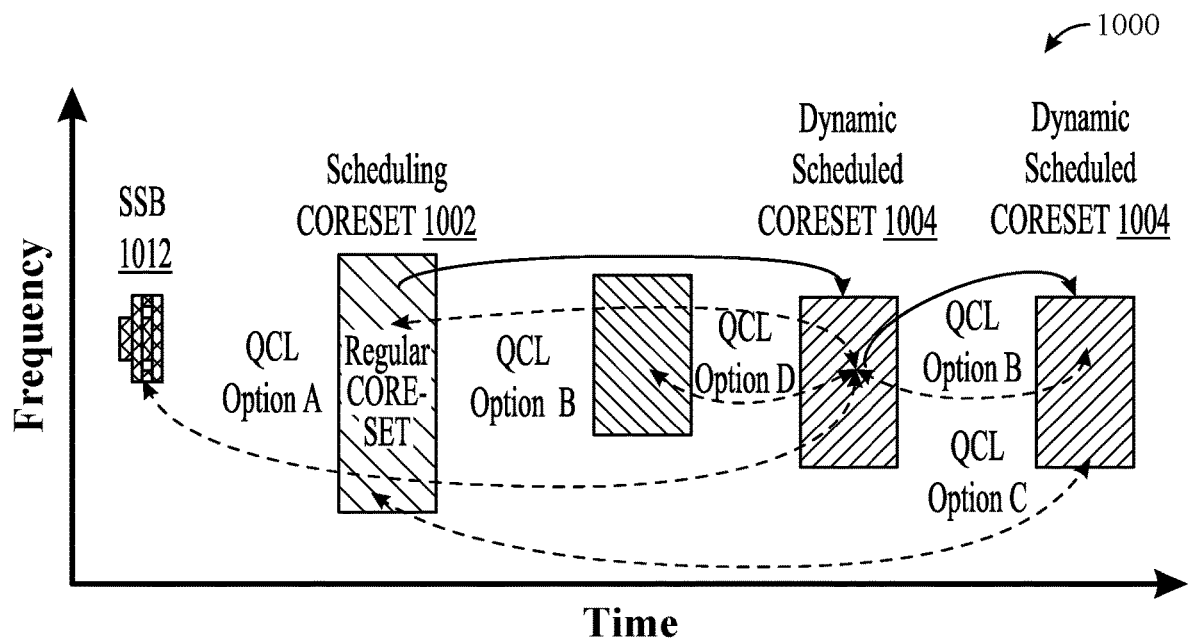
FIGS. 10-11 illustrate example timing diagrams for dynamic control resource signaling, in accordance with some aspects of the present disclosure.

For example, according to a first option, labeled QCL Option A in FIG. 10, PDCCH DMRS for the dynamic CORESET 1004 may be QCL'ed with the SSB 1012 that the UE identified during the initial access procedure (and used to locate the regular scheduling CORESET 1002). For example, the UE may monitor the dynamic CORESET with a same receive beam corresponding to the SSB.

According to a second option, labeled QCL Option B in FIG. 10, PDCCH DMRS for the dynamic CORESET may be QCL'ed with PDCCH DMRS for the scheduling CORESET (regardless if dynamic or regular). In other words, if the regular CORESET schedules the dynamic CORESET, the PDCCH DMRS for the dynamic CORESET is QCL'ed with the PDCCH DMRS for the regular CORESET. If another dynamic CORESET schedules the dynamic CORESET, the PDCCH DMRS for the scheduled dynamic CORESET is QCL'ed with the PDCCH DMRS for the scheduling dynamic CORESET.

According to a third option, labeled as QCL Option C in FIG. 10, PDCCH DMRS for the dynamic CORESET is QCL'ed with PDCCH DMRS for the original scheduling CORESET (e.g., only if the scheduling CORESET is a regular CORESET).

According to a fourth option, labeled as QCL Option D in FIG. 10, PDCCH DMRS for dynamic CORESET is QCL'ed with PDCCH DMRS for a CORESET with the lowest controlResourceSetId in a latest slot. In this case, that CORESET can be dynamic or regular. The lowest ID could be for dynamic CORESETs only, regular CORESETs only, or both.

In some cases, one of multiple options (e.g., one of the four options A-D described above), may be signaled or specified.

In some cases, TCI may not be enabled in the DCI, the DCI may come before reception of an activation command for a PDSCH TCI, the DCI may not have a TCI field present, or the UE may not have sufficient time to apply a TCI state indicated in the DCI (e.g., if time offset between DCI and dynamic CORESET<timeDurationForQCL). In such cases (e.g., before the UE is signaled TCI states, before the UE receives signaling activating a TCI state, or before the UE is signaled an active TCI state with sufficient time to apply for monitoring the dynamic CORESET for at least a second PDCCH), then the UE may assume PDCCH DMRS PDCCH DMRS for the dynamic CORESET may be QCL'ed with the one or more DL RS configured by a latest TCI state for the scheduling CORESET (e.g., the CORESET with the DCI co-scheduling PDSCH and the dynamic CORESET) in some cases.

Figure 11:
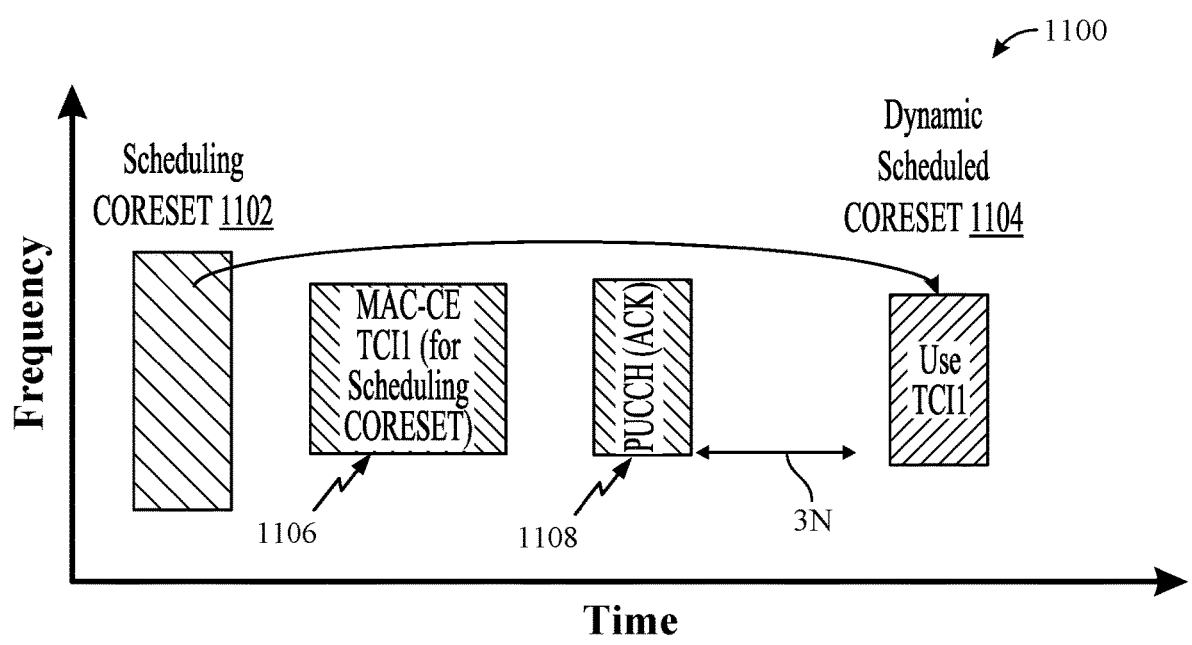

For example, as illustrated in FIG. 11, the UE may assume PDCCH DMRS PDCCH DMRS for the dynamic CORESET 1104 may be QCL'ed with the one or more DL RS configured by a latest TCI state for the scheduling CORESET 1102 if the dynamic CORESET is in a slot that is $3N_{slot}^{subframe,\mu}$ from an acknowledgment 1108 of a MAC-CE 1106 activation for the scheduling CORESET (regardless of whether the scheduling CORESET is dynamic or regular).

In some cases, a DCI (scheduling a dynamic CORESET) received on one CC may schedule a dynamic CORESET on another CC. In such cases, the parameter timeDurationForQCL may be determined based on the subcarrier spacing of the dynamic CORESET ($\mu_{dynamic\_PDCCH}$) relative to a subcarrier spacing of the scheduling CORESET ($\mu_{PDCCH}$). For example, if $\mu_{PDCCH} < \mu_{dynamic\_PDCCH}$, an additional timing delay d may be added to timeDurationForQCL.

In some cases, a DCI (scheduling a dynamic CORESET) received on one CC may schedule a dynamic CORESET on another CC. In such cases, if TCI in the co-scheduling DCI is enabled and the offset between the DCI and the dynamic CORESET is less than timeDurationForQCL (or if TCI in DCI is not configured), then the UE may obtain its QCL assumption for the dynamic PDCCH from the activated TCI state with the lowest ID applicable to PDSCH (e.g., in the active BWP of the scheduled cell).

Example Communications Device

Figure 12:
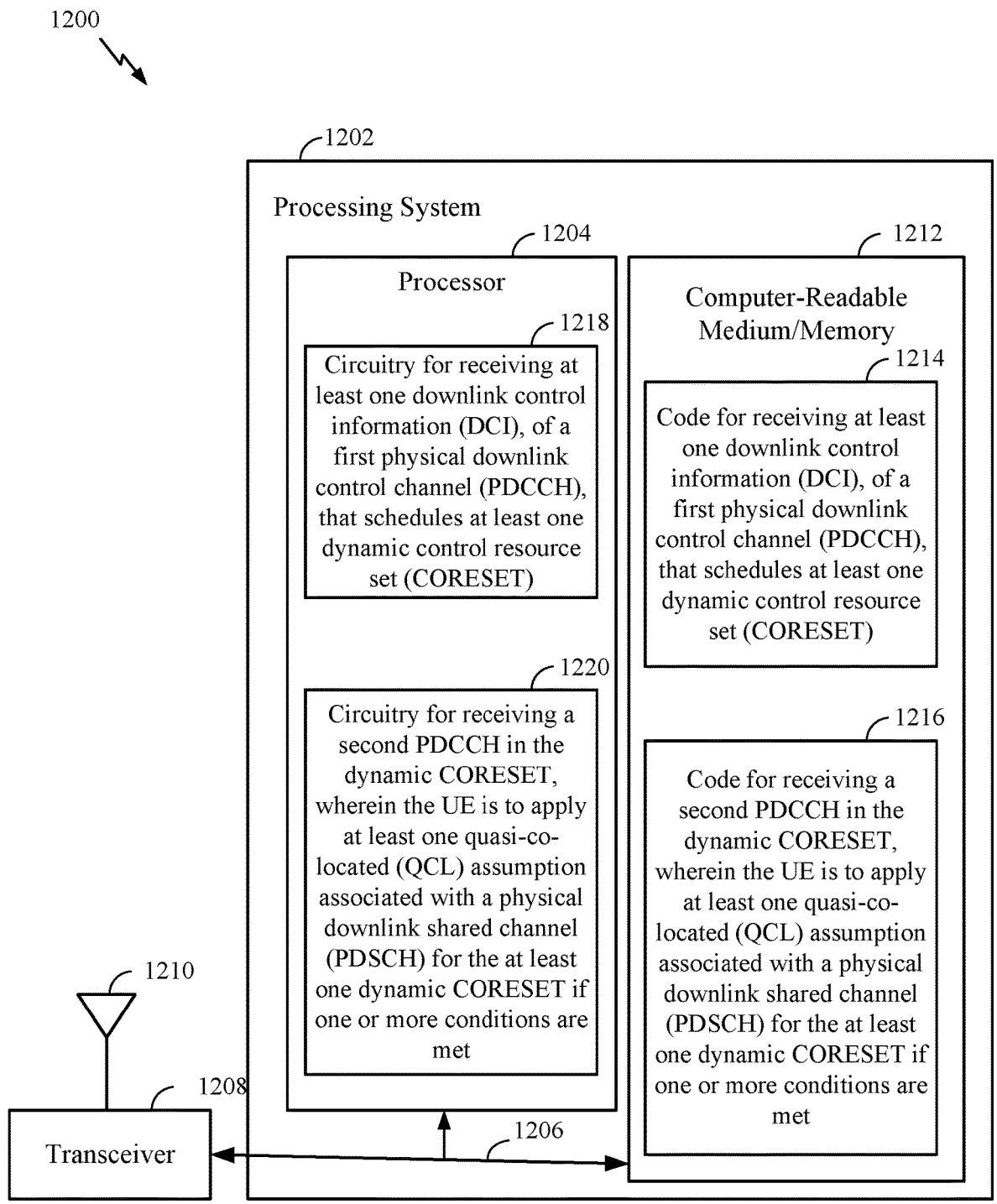
FIGS. 12-13 illustrate example communications devices that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/ memory 1212 is configured to store instructions (e.g., computer-executable code) that when executed by the processor 1204, cause the processor 1204 to perform the operations illustrated in FIG. 7, or other operations for performing the various techniques discussed herein. In certain aspects, computer-readable medium/memory 1212 stores code 1214 for receiving at least one downlink control information (DCI), of a first physical downlink control channel (PDCCH), that schedules at least one dynamic control resource set (CORESET); and code 1216 for receiving a second PDCCH in the dynamic CORESET, wherein the UE is to apply at least one quasi-co-located (QCL) assumption associated with a physical downlink shared channel (PDSCH) for the at least one dynamic CORESET if one or more conditions are met. In certain aspects, the processor 1204 has circuitry configured to implement the code stored in the computer-readable medium/memory 1212. The processor 1204 includes circuitry 1218 for receiving at least one DCI, of a first PDCCH, that schedules at least one dynamic CORESET; and circuitry 1220 for receiving a second PDCCH in the dynamic CORESET, wherein the UE is to apply at least one QCL assumption associated with a PDSCH for the at least one dynamic CORESET if one or more conditions are met.

Figure 13:
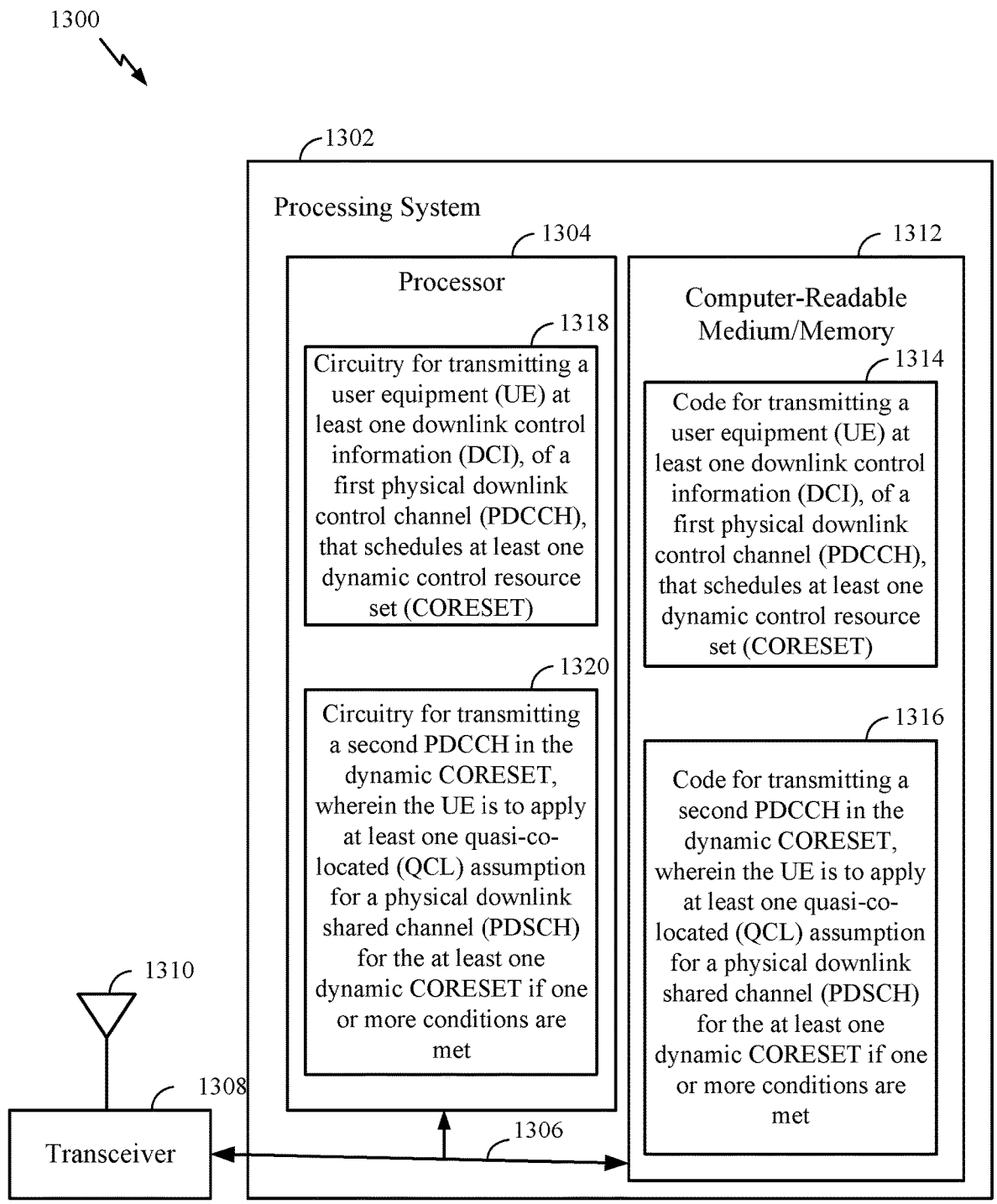

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/ memory 1312 is configured to store instructions (e.g., computer-executable code) that when executed by the processor 1304, cause the processor 1304 to perform the operations illustrated in FIG. 11, or other operations for performing the various techniques discussed herein. In certain aspects, computer-readable medium/memory 1312 stores: code 1314 for transmitting a UE at least one DCI, of a first PDCCH, that schedules at least one dynamic CORESET; and code 1316 for transmitting a second PDCCH in the dynamic CORESET, wherein the UE is to apply at least one QCL assumption for a PDSCH for the at least one dynamic CORESET if one or more conditions are met. In certain aspects, the processor 1304 has circuitry configured to implement the code stored in the computer-readable medium/memory 1312. The processor 1304 includes circuitry 1318 for transmitting a UE at least one DCI, of a first PDCCH, that schedules at least one dynamic CORESET; and circuitry 1320 for transmitting a second PDCCH in the dynamic CORESET, wherein the UE is to apply at least one QCL assumption for a PDSCH for the at least one dynamic CORESET if one or more conditions are met.

Example Methods

Figure 14:
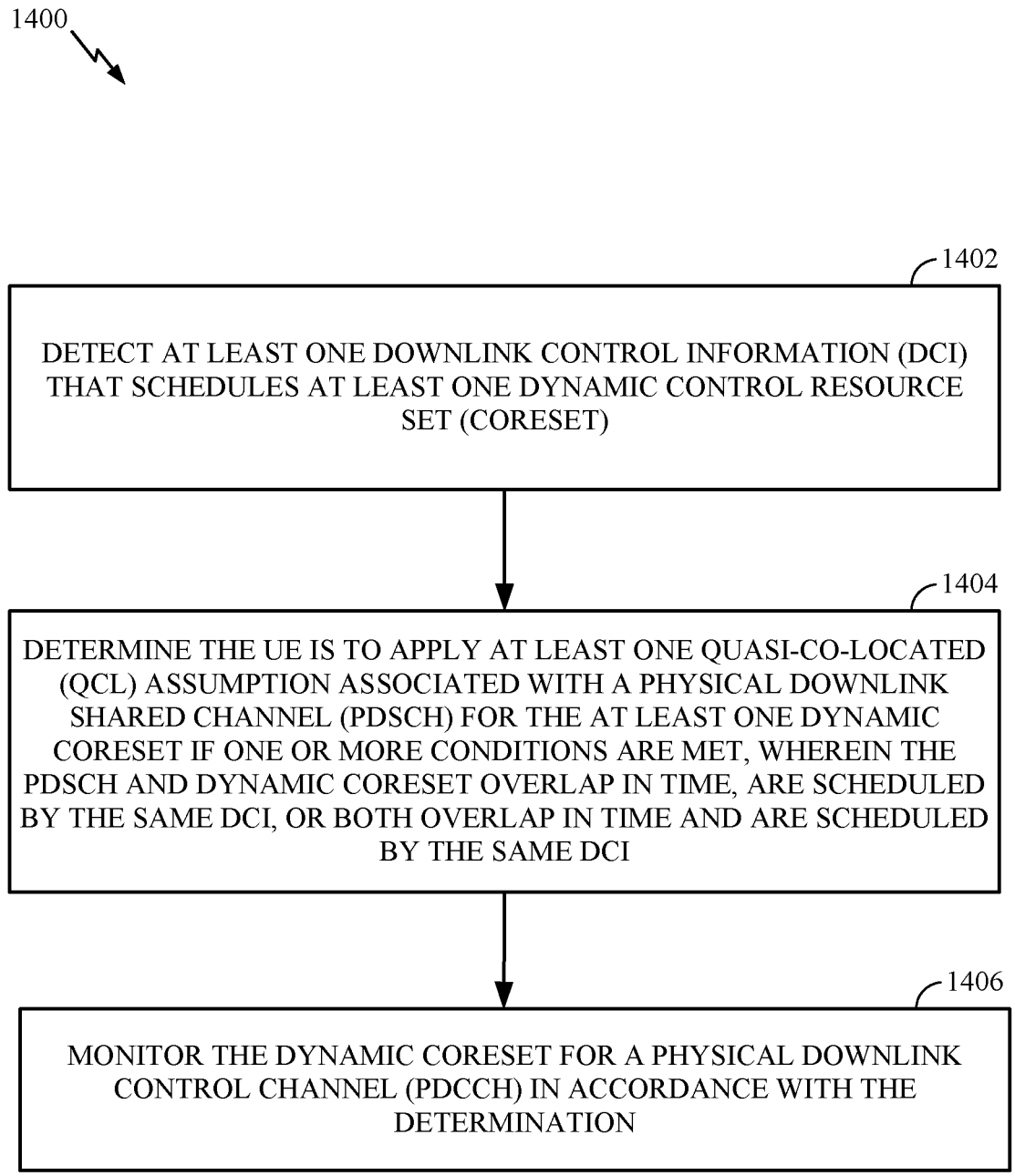
FIG. 14 illustrates example operations for wireless communications by a user equipment (UE), in accordance with certain aspects of the present disclosure.

FIG. 14 illustrates example operations 1400 for wireless communications by a UE, in accordance with certain aspects of the present disclosure. For example, operations 1400 may be performed by a UE 120 of FIG. 1 to determine QCL assumptions for dynamic CORESETs.

Operations 1400 begin, at 1402, by detecting at least one downlink control information (DCI) that schedules at least one dynamic control resource set (CORESET). For example, referring back to FIG. 10, a first PDCCH (PDCCH1) in a regular (sparse) CORESET can indicate one or more dynamic CORESETs. The dynamic CORESETs could be nested in PDSCH regions or standalone a could indicate other dynamic CORESETs. In the case where a single PDCCH indicates the dynamic CORESET and schedules a PDSCH, the PDSCH and dynamic CORESET are referred to herein as "co-scheduled."

At 1404, the UE determines the UE is to apply at least one quasi-co-located (QCL) assumption associated with a physical downlink shared channel (PDSCH) for the at least one dynamic CORESET if one or more conditions are met, wherein the PDSCH and dynamic CORESET overlap in time, are scheduled by the same DCI, or both overlap in time and are scheduled by the same DCI. As will be described in greater detail below, in case the UE is not provided with a TCI state configuration or does not receive an activation command in sufficient time to apply to the dynamic CORESET, in some cases, the UE may reuse the TCI/QCL assumptions for the PDSCH co-scheduled with the dynamic CORESET.

At 1406, the UE monitors the dynamic CORESET for a physical downlink control channel (PDCCH) in accordance with the determination. For example, the UE may monitor the dynamic CORESET using QCL/TCI assumptions of the co-scheduled PDSCH, if applicable.

Figure 15:
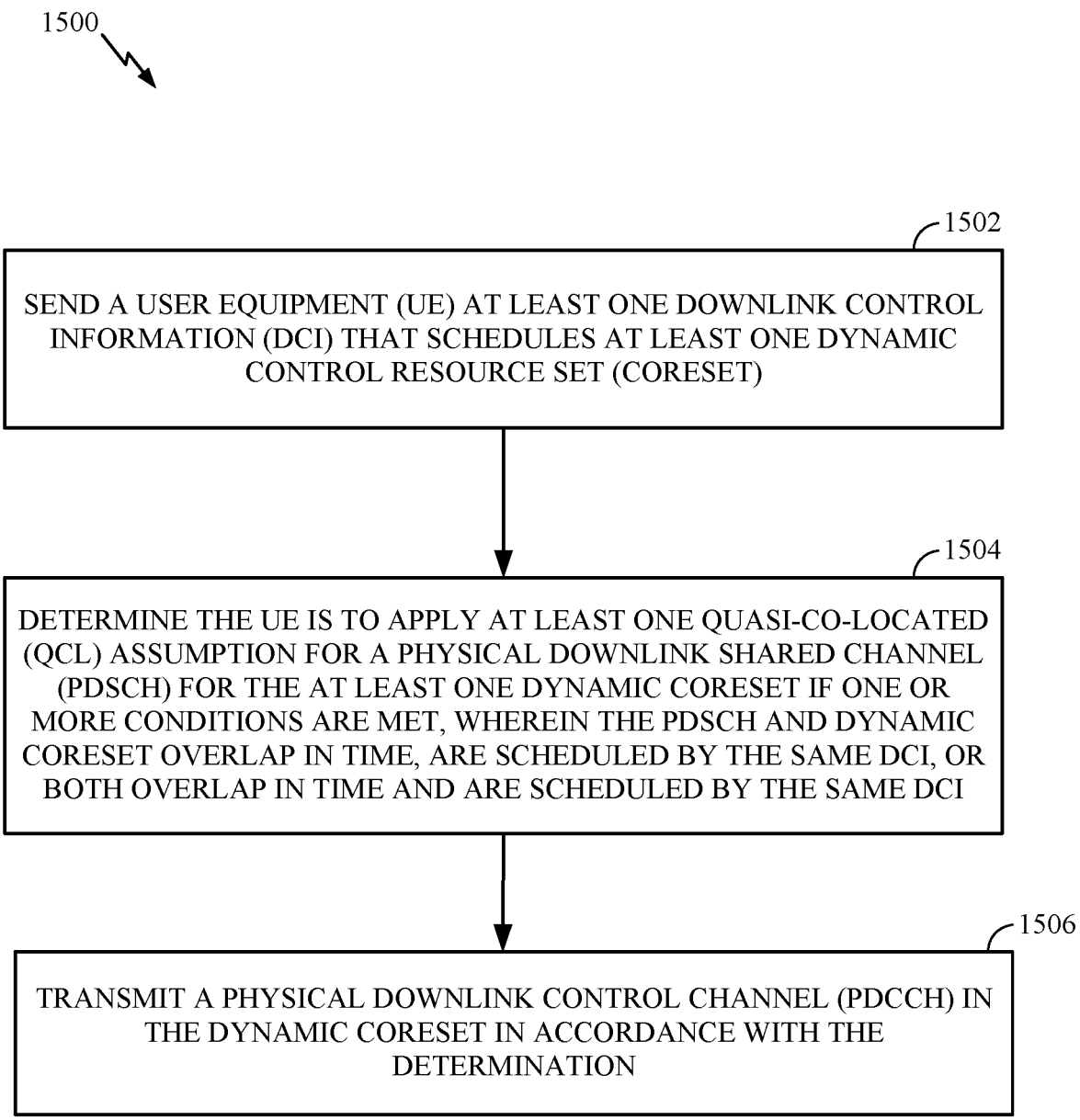
FIG. 15 illustrates example operations for wireless communications by a network entity, in accordance with certain aspects of the present disclosure.

FIG. 15 illustrates example operations 1500 for wireless communications by a network entity and may be considered complementary to operations 1400 of FIG. 14. For example, operations 1500 may be performed by a gNB scheduling transmissions to a UE 120 performing operations 1400 of FIG. 14.

Operations 1500 begin, at 1502, by sending a user equipment (UE) at least one downlink control information (DCI) that schedules at least one dynamic control resource set (CORESET).

At 1504, the network entity determines the UE is to apply at least one quasi-co-located (QCL) assumption for a physical downlink shared channel (PDSCH) for the at least one dynamic CORESET if one or more conditions are met, wherein the PDSCH and dynamic CORESET overlap in time, are scheduled by the same DCI, or both overlap in time and are scheduled by the same DCI. At 1506, the network entity transmits a physical downlink control channel (PDCCH) in the dynamic CORESET in accordance with the determination.

Example Aspects

Aspect 1. A method for wireless communications by a user equipment (UE), comprising detecting at least one downlink control information (DCI) that schedules at least one dynamic control resource set (CORESET); determining the UE is to apply at least one quasi-co-located (QCL) assumption associated with a physical downlink shared channel (PDSCH) for the at least one dynamic CORESET if one or more conditions are met, wherein the PDSCH and dynamic CORESET overlap in time, are scheduled by the same DCI, or both overlap in time and are scheduled by the same DCI; and monitoring the dynamic CORESET for a physical downlink control channel (PDCCH) in accordance with the determination.

Aspect 2. The method of Aspect 1, wherein the one or more conditions comprise the UE receiving an indication the UE is to apply at least one quasi-co-located (QCL) assumption associated with the PDSCH for the at least one dynamic CORESET.

Aspect 3. The method of Aspect 2, wherein the indication is conveyed via at least one of a radio resource control (RRC) reconfiguration message or in a downlink control information (DCI) that scheduled the dynamic CORESET.

Aspect 4. The method of Aspect 2 or 3, wherein the indication is implicit if the UE is not configured with transmission configuration information (TCI) states for the dynamic CORESET.

Aspect 5. The method of any of Aspects 1-4, wherein the one or more conditions comprise a dynamic control information (DCI) of the first PDCCH has a transmission configuration information (TCI) field for the PDSCH; and a time offset between the DCI and the dynamic CORESET is greater than or equal to a time duration for applying new QCL.

Aspect 6. The method of Aspect 5, wherein the UE monitors the dynamic CORESET assuming a TCI state for PDCCH demodulation reference signals (DMRS) indicated by the TCI field.

Aspect 7. The method of Aspect 5 or 6, wherein the one or more conditions comprise the co-scheduled PDSCH and dynamic CORESET overlap fully or partially in time.

Aspect 8. The method of any of Aspects 5-7, wherein, in case at least two TCI states are indicated for the PDSCH, the UE uses the same TCI state for the dynamic CORESET and PDSCH.

Aspect 9. The method of Aspect 8, wherein if the at least two TCI states are configured for a time division multiplexed scheme and the scheduled PDSCH and dynamic CORESET overlap fully or partially in time, the UE uses one of the TCI states used for the overlapping portion of the PDSCH.

Aspect 10. The method of Aspect 8 or 9, wherein if the at least two TCI states are configured for a time division multiplexed scheme and the scheduled PDSCH and dynamic CORESET do not overlap fully or partially in time, the UE determines which of the at least two TCI states to use based on signaling or a configuration.

Aspect 11. The method of any of Aspects 8-10, wherein if the at least two TCI states are configured for a frequency division multiplexed scheme, the UE determines which of the at least two TCI states to use based on signaling or a configuration.

Aspect 12. The method of any of Aspects 5-11, wherein regardless of a time offset between the DCI and the dynamic CORESET, if none of the configured TCI states for the scheduled PDSCH contain spatial relation QCL information, the UE obtains QCL assumptions, other than spatial relation QCL information, from indicated TCI states for the scheduled PDSCH.

Aspect 13. The method of any of Aspects 1-12, wherein, before the UE is signaled transmission configuration (TCI) states, before the UE receives signaling activating a TCI state, or before the UE is signaled an active TCI state for the PDSCH with sufficient time to apply for monitoring the dynamic CORESET for at least a second PDCCH, the QCL assumption for the dynamic CORESET is determined based on an assumption a demodulation reference signal (DMRS) of the second PDCCH shares a QCL relationship with at least one prior downlink transmission.

Aspect 14. The method of Aspect 13, wherein the QCL assumption is determined based on an assumption a DMRS of the second PDCCH shares a QCL relationship with a synchronization signal block (SSB) the UE identified during an initial access procedure.

Aspect 15. The method of Aspect 13 or 14, wherein the QCL assumption is determined based on an assumption a DMRS of the second PDCCH shares a QCL relationship with at least one of: a DMRS for the first PDCCH or a CORESET with a lowest CORESET ID in a slot before a slot containing the dynamic CORESET.

Aspect 16. The method of any of Aspects 13-15, further comprising receiving signaling of an indication of how the UE is to determine the QCL assumption based on an assumption a demodulation reference signal (DMRS) of the second PDCCH shares a QCL relationship with at least one prior downlink transmission.

Aspect 17. The method of any of Aspects 1-16, wherein, before the UE is signaled transmission configuration (TCI) states, before the UE receives signaling activating a TCI state, or before the UE is signaled an active TCI state for the PDSCH with sufficient time to apply for monitoring the dynamic CORESET for at least a second PDCCH, the QCL assumption for the dynamic CORESET is determined based on an assumption a demodulation reference signal (DMRS) of the second PDCCH shares a QCL relationship with at least one downlink reference signal configured by a latest TCI state for the CORESET in which the first PDCCH was detected.

Aspect 18. The method of any of Aspects 1-17, wherein, if the first PDCCH is received on a first component carrier (CC) and the dynamic CORESET is on a second CC, the UE determines a time duration for applying the QCL assumption based on a subcarrier spacing (SCS) of the dynamic CORESET if the SCS of the dynamic CORESET is greater than an SCS of a CORESET in which the first PDCCH is detected.

Aspect 19. The method of any of Aspects 1-18, wherein, if the first PDCCH is received on a first component carrier (CC) and the dynamic CORESET is on a second CC, the UE determines the QCL assumption for the dynamic CORESET from an active transmission configuration (TCI) state with a the TCI state ID applicable to a PDCCH in an active bandwidth part (BWP) of the second CC.

Aspect 20. A method for wireless communications by a network entity, comprising sending a UE at least one downlink control information (DCI) that schedules at least one dynamic control resource set (CORESET); determining the UE is to apply at least one quasi-co-located (QCL) assumption for a physical downlink shared channel (PDSCH) for the at least one dynamic CORESET if one or more conditions are met, wherein the PDSCH and dynamic CORESET overlap in time, are scheduled by the same DCI, or both overlap in time and are scheduled by the same DCI; and transmitting a physical downlink control channel (PDCCH) in the dynamic CORESET in accordance with the determination.

Aspect 21. The method of Aspect 20, wherein the one or more conditions comprise the network entity signaling the UE an indication the UE is to apply at least one quasi-co-located (QCL) assumption associated with the PDSCH for the at least one dynamic CORESET.

Aspect 22. The method of Aspect 21, wherein the indication is conveyed via at least one of a radio resource control (RRC) reconfiguration message or in a downlink control information (DCI) that scheduled the dynamic CORESET.

Aspect 23. The method of Aspect 21 or 22, wherein the indication is implicit if the network entity does not configure transmission configuration information (TCI) states for the dynamic CORESET.

Aspect 24. The method of Aspect 20, wherein the one or more conditions comprise a dynamic control information (DCI) of the first PDCCH has a transmission configuration information (TCI) field for the PDSCH; and a time offset between the DCI and the dynamic CORESET is greater than or equal to a time duration for applying new QCL.

Aspect 25. The method of Aspect 24, wherein the network entity transmits the second PDCCH assuming the UE monitors the dynamic CORESET assuming a TCI state for PDCCH demodulation reference signals (DMRS) indicated by the TCI field.

Aspect 26. The method of Aspect 24 or 25, wherein the one or more conditions comprise the co-scheduled PDSCH and dynamic CORESET overlap fully or partially in time.

Aspect 27. The method of any of Aspects 24-26, wherein, in case at least two TCI states are indicated for the PDSCH, the UE uses the same TCI state for the dynamic CORESET and PDSCH.

Aspect 28. The method of Aspect 27, wherein if the at least two TCI states are configured for a time division multiplexed scheme and the scheduled PDSCH and dynamic CORESET overlap fully or partially in time, the UE uses one of the TCI states used for the overlapping portion of the PDSCH.

Aspect 29. The method of Aspect 27 or 28, wherein if the at least two TCI states are configured for a time division multiplexed scheme and the scheduled PDSCH and dynamic CORESET do not overlap fully or partially in time, the UE determines which of the at least two TCI states to use based on signaling or a configuration.

Aspect 30. The method of any of Aspects 27-29, wherein if the at least two TCI states are configured for a frequency division multiplexed scheme, the UE determines which of the at least two TCI states to use based on signaling or a configuration.

Aspect 31. The method of any of Aspects 24-30, wherein regardless of a time offset between the DCI and the dynamic CORESET, if none of the configured TCI states for the scheduled PDSCH contain spatial relation QCL information, the UE obtains QCL assumptions, other than spatial relation QCL information, from indicated TCI states for the scheduled PDSCH.

Aspect 32. The method of any of Aspects 20-31, wherein, before the UE is signaled transmission configuration (TCI) states, before the UE receives signaling activating a TCI state, or before the UE is signaled an active TCI state for the PDSCH with sufficient time to apply for monitoring the dynamic CORESET for at least a second PDCCH, the QCL assumption for the dynamic CORESET is determined based on an assumption a demodulation reference signal (DMRS) of the second PDCCH shares a QCL relationship with at least one prior downlink transmission.

Aspect 33. The method of Aspect 32, wherein the QCL assumption is determined based on an assumption a DMRS of the second PDCCH shares a QCL relationship with a synchronization signal block (SSB) the UE identified during an initial access procedure.

Aspect 34. The method of Aspect 32 or 33, wherein the QCL assumption is determined based on an assumption a DMRS of the second PDCCH shares a QCL relationship with at least one of: a DMRS for the first PDCCH or a control resource set (CORESET) with a lowest CORESET ID in a slot before a slot containing the dynamic CORESET.

Aspect 35. The method of any of Aspects 32-34, further comprising signaling the UE an indication of how the UE is to determine the QCL assumption based on an assumption a demodulation reference signal (DMRS) of the second PDCCH shares a QCL relationship with at least one prior downlink transmission.

Aspect 36. The method of any of Aspects 20-35, wherein, before the UE is signaled transmission configuration (TCI) states, before the UE receives signaling activating a TCI state, or before the UE is signaled an active TCI state for the PDSCH with sufficient time to apply for monitoring the dynamic CORESET for at least a second PDCCH, the QCL assumption for the dynamic CORESET is determined based on an assumption a demodulation reference signal (DMRS) of the second PDCCH shares a QCL relationship with at least one downlink reference signal configured by a latest TCI state for the CORESET in which the first PDCCH was detected.

Aspect 37. The method of any of Aspects 20-36, wherein, if the network entity sends the first PDCCH on a first component carrier (CC) and the dynamic CORESET is on a second CC, the UE determines a time duration for applying the QCL assumption based on a subcarrier spacing (SCS) of the dynamic CORESET if the SCS of the dynamic CORESET is greater than an SCS of a CORESET in which the first PDCCH is detected.

Aspect 38. The method of any of Aspects 20-37, wherein, if the network entity sends the first PDCCH on a first component carrier (CC) and the dynamic CORESET is on a second CC, the UE determines the QCL assumption for the dynamic CORESET from an active transmission configuration (TCI) state with a the TCI state ID applicable to a PDCCH in an active bandwidth part (BWP) of the second CC.

Aspect 39. A method for wireless communications by a UE, comprising receiving at least one DCI, of a first PDCCH, that schedules at least one dynamic CORESET; and receiving a second PDCCH in the dynamic CORESET, wherein the UE is to apply at least one QCL assumption associated with a PDSCH for the at least one dynamic CORESET if one or more conditions are met.

Aspect 40. The method of Aspect 39, wherein the one or more conditions comprise the UE receiving an indication the UE is to apply at least one QCL assumption associated with the PDSCH for the at least one dynamic CORESET.

Aspect 41. The method of Aspect 40, wherein the indication is conveyed via at least one of a RRC reconfiguration message or in a DCI that schedules the dynamic CORESET.

Aspect 42. The method of Aspect 40 or 41, wherein the indication is implicit if the UE is not configured with TCI states for the dynamic CORESET.

Aspect 43. The method of Aspect 39, wherein the one or more conditions comprise the PDSCH and dynamic CORESET are co-scheduled by the same DCI; the at least one DCI of the first PDCCH has a TCI field for the PDSCH; and a time offset between the DCI and the dynamic CORESET is greater than or equal to a time duration for applying new QCL.

Aspect 44. The method of Aspect 43, wherein the UE monitors the dynamic CORESET based on a TCI state for PDCCH DMRS indicated by the TCI field.

Aspect 45. The method of Aspect 43 or 44, wherein the one or more conditions comprise the co-scheduled PDSCH and dynamic CORESET overlap fully or partially in time.

Aspect 46. The method of any of Aspects 43-45, wherein, in case at least two TCI states are indicated for the PDSCH, the UE uses the same TCI state for monitoring the dynamic CORESET and receiving the PDSCH.

Aspect 47. The method of Aspect 46, wherein if the at least two TCI states are configured for a time division multiplexed scheme and the co-scheduled PDSCH and dynamic CORESET overlap fully or partially in time, the UE uses one of the TCI states used for an overlapping portion of the PDSCH.

Aspect 48. The method of Aspect 46 or 47, wherein if the at least two TCI states are configured for a time division multiplexed scheme and the co-scheduled PDSCH and dynamic CORESET do not overlap fully or partially in time, the same TCI state for monitoring the dynamic CORESET and receiving the PDSCH is based on signaling or a configuration.

Aspect 49. The method of any of Aspects 46-48, wherein if the at least two TCI states are configured for a frequency division multiplexed scheme, the same TCI state for monitoring the dynamic CORESET and receiving the PDSCH is based on signaling or a configuration.

Aspect 50. The method of any of Aspects 43-49, wherein the UE obtains QCL assumptions from indicated TCI states for the co-scheduled PDSCH.

Aspect 51. The method of any of Aspects 39-50, wherein, the QCL assumption for the dynamic CORESET is based on an assumption that a DMRS of the second PDCCH shares a QCL relationship with at least one prior downlink transmission.

Aspect 52. The method of Aspect 51, wherein the QCL assumption is based on an assumption that a DMRS of the second PDCCH shares a QCL relationship with a SSB the UE identified during an initial access procedure.

Aspect 53. The method of Aspect 51 or 52, wherein the QCL assumption is based on an assumption that a DMRS of the second PDCCH shares a QCL relationship with at least one of: a DMRS for the first PDCCH or a CORESET with a lowest CORESET ID in a slot before a slot containing the dynamic CORESET.

Aspect 54. The method of any of Aspects 51-53, further comprising receiving signaling of an indication that the QCL assumption is based on an assumption that a DMRS of the second PDCCH shares a QCL relationship with at least one prior downlink transmission.

Aspect 55. The method of any of Aspects 39-54, wherein, before the UE is signaled TCI states, before the UE receives signaling activating a TCI state, or before the UE is signaled an active TCI state for the PDSCH with sufficient time to apply for receiving the dynamic CORESET for at least the second PDCCH, the QCL assumption for the dynamic CORESET is based on an assumption a DMRS of the second PDCCH shares a QCL relationship with at least one downlink reference signal configured by a latest TCI state for the CORESET in which the first PDCCH was received.

Aspect 56. The method of any of Aspects 39-55, wherein, if the first PDCCH is received on a first CC and the dynamic CORESET is on a second CC, then a time duration for applying the QCL assumption is based on a SCS of the dynamic CORESET if the SCS of the dynamic CORESET is greater than an SCS of a CORESET in which the first PDCCH is received.

Aspect 57. The method of any of Aspects 39-56, wherein, if the first PDCCH is received on a first CC and the dynamic CORESET is on a second CC, then the QCL assumption is for the dynamic CORESET from an active TCI state with a TCI state ID applicable to a PDCCH in an active BWP of the second CC.

Aspect 58. A method for wireless communications by a network entity, comprising transmitting to a UE at least one downlink DCI, of a first PDCCH, that schedules at least one dynamic CORESET; and transmitting a second PDCCH in the dynamic CORESET, wherein the UE is to apply at least one QCL assumption for a PDSCH for the at least one dynamic CORESET if one or more conditions are met.

Aspect 59. The method of Aspect 58, wherein the one or more conditions comprise the network entity signaling the UE an indication the UE is to apply at least one QCL assumption associated with the PDSCH for the at least one dynamic CORESET.

Aspect 60. The method of Aspect 59, wherein the indication is conveyed via at least one of a RRC reconfiguration message or in a DCI that schedules the dynamic CORESET.

Aspect 61. The method of Aspect 59 or 60, wherein the indication is implicit if the network entity does not configure TCI states for the dynamic CORESET.

Aspect 62. The method of any of Aspects 58-61, wherein the one or more conditions comprise the PDSCH and dynamic CORESET are co-scheduled by the same DCI; the at least one DCI of the first PDCCH has a TCI field for the PDSCH; and a time offset between the DCI and the dynamic CORESET is greater than or equal to a time duration for applying new QCL.

Aspect 63. The method of Aspect 62, wherein the network entity transmits the second PDCCH assuming the UE is configured to receive the dynamic CORESET assuming a TCI state for PDCCH DMRS indicated by the TCI field.

Aspect 64. The method of Aspect 62 or 63, wherein the one or more conditions comprise the co-scheduled PDSCH and dynamic CORESET overlap fully or partially in time.

Aspect 65. The method of any of Aspects 62-64, wherein, in case at least two TCI states are indicated for the PDSCH, the UE uses the same TCI state for the dynamic CORESET and PDSCH.

Aspect 66. The method of Aspect 65, wherein if the at least two TCI states are configured for a time division multiplexed scheme and the co-scheduled PDSCH and dynamic CORESET overlap fully or partially in time, the UE uses one of the TCI states used for an overlapping portion of the PDSCH.

Aspect 67: An apparatus, comprising: a memory comprising executable instructions; and one or more processors configured to execute the executable instructions and cause the apparatus to perform a method in accordance with any one of Aspects 1-66.

Aspect 68: An apparatus, comprising means for performing a method in accordance with any one of Aspects 1-66.

Aspect 69: A non-transitory computer-readable medium comprising executable instructions that, when executed by one or more processors of an apparatus, cause the apparatus to perform a method in accordance with any one of Aspects 1-66.

Aspect 70: A computer program product embodied on a computer-readable storage medium comprising code for performing a method in accordance with any one of Aspects 1-66.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors 258, 264, 266, and/or controller/processor 280 of the UE 120 and/or processors 220, 230, 238, and/or controller/processor 240 of the BS 110 shown in FIG. 2 may be configured to perform operations 800 of FIG. 8 (and/or operations 1400 of FIG. 14) or operations 900 of FIG. 9 (and/or operations 1500 of FIG. 15).

Means for receiving may include a receiver (such as one or more antennas or receive processors) illustrated in FIG. 2. Means for transmitting may include a transmitter (such as one or more antennas or transmit processors) illustrated in FIG. 2. Means for determining, means for processing, means for treating, and means for applying may include a processing system, which may include one or more processors, such as processors 258, 264, 266, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving at least one downlink control information (DCI), of a first physical downlink control channel (PDCCH), that schedules at least one dynamic control resource set (CORESET); and
   receiving a second PDCCH in the at least one dynamic CORESET, wherein the UE is to apply at least one quasi-co-located (QCL) assumption associated with a physical downlink shared channel (PDSCH) for the at least one dynamic CORESET if one or more conditions are met.

2. The method of claim 1, wherein the one or more conditions comprise the UE receiving an indication the UE is to apply the at least one QCL assumption associated with the PDSCH for the at least one dynamic CORESET.

3. The method of claim 2, wherein the indication is conveyed via at least one of a radio resource control (RRC) reconfiguration message or in the at least one downlink control information (DCI) that schedules the at least one dynamic CORESET.

4. The method of claim 2, wherein the indication is implicit if the UE is not configured with transmission configuration information (TCI) states for the at least one dynamic CORESET.

5. The method of claim 1, wherein the one or more conditions comprise:
   the PDSCH and the at least one dynamic CORESET are co-scheduled by the same at least one DCI;
   the at least one DCI of the first PDCCH has a transmission configuration information (TCI) field for the PDSCH; and
   a time offset between the at least one DCI and the at least one dynamic CORESET is greater than or equal to a time duration for applying the at least one QCL assumption.

6. The method of claim 5, wherein the UE monitors the at least one dynamic CORESET based on a TCI state for PDCCH demodulation reference signals (DMRS) indicated by the TCI field.

7. The method of claim 5, wherein the one or more conditions comprise the co-scheduled PDSCH and the at least one dynamic CORESET overlap fully or partially in time.

8. The method of claim 5, wherein, in case at least two TCI states are indicated for the PDSCH, the UE uses the same TCI state for monitoring the at least one dynamic CORESET and receiving the PDSCH.

9. The method of claim 8, wherein:
   if the at least two TCI states are configured for a time division multiplexed scheme and the co-scheduled PDSCH and the at least one dynamic CORESET overlap fully or partially in time, the UE uses one of the TCI states used for an overlapping portion of the PDSCH.

10. The method of claim 8, wherein:
    if the at least two TCI states are configured for a time division multiplexed scheme and the co-scheduled PDSCH and the at least one dynamic CORESET do not overlap fully or partially in time, the same TCI state for monitoring the at least one dynamic CORESET and receiving the PDSCH is based on signaling or a configuration.

11. The method of claim 8, wherein:
    if the at least two TCI states are configured for a frequency division multiplexed scheme, the same TCI state for monitoring the at least one dynamic CORESET and receiving the PDSCH is based on signaling or a configuration.

12. The method of claim 5, wherein the UE obtains QCL assumptions from indicated TCI states for the co-scheduled PDSCH.

13. The method of claim 1, wherein, the at least one QCL assumption for the at least one dynamic CORESET is based on an assumption that a demodulation reference signal (DMRS) of the second PDCCH shares a QCL relationship with at least one prior downlink transmission.

14. The method of claim 13, wherein the at least one QCL assumption is based on an assumption that a DMRS of the second PDCCH shares a QCL relationship with a synchronization signal block (SSB) the UE identified during an initial access procedure.

15. The method of claim 13, wherein the at least one QCL assumption is based on an assumption that a DMRS of the second PDCCH shares a QCL relationship with at least one of: a DMRS for the first PDCCH or a CORESET with a lowest CORESET ID in a slot before a slot containing the at least one dynamic CORESET.

16. The method of claim 13, further comprising receiving signaling of an indication that the at least one QCL assumption is based on an assumption that a demodulation reference signal (DMRS) of the second PDCCH shares a QCL relationship with at least one prior downlink transmission.

17. The method of claim 1, wherein, before the UE is signaled transmission configuration (TCI) states, before the UE receives signaling activating a TCI state, or before the UE is signaled an active TCI state for the PDSCH with sufficient time to apply for receiving the at least one dynamic CORESET for at least the second PDCCH, the at least one QCL assumption for the at least one dynamic CORESET is based on an assumption a demodulation reference signal (DMRS) of the second PDCCH shares a QCL relationship with at least one downlink reference signal configured by a latest TCI state for the at least one dynamic CORESET in which the first PDCCH was received.

18. The method of claim 1, wherein, if the first PDCCH is received on a first component carrier (CC) and the at least one dynamic CORESET is on a second CC, then a time duration for applying the at least one QCL assumption is based on a subcarrier spacing (SCS) of the at least one dynamic CORESET if the SCS of the at least one dynamic CORESET is greater than an SCS of a CORESET in which the first PDCCH is received.

19. The method of claim 1, wherein, if the first PDCCH is received on a first component carrier (CC) and the at least one dynamic CORESET is on a second CC, then the at least one QCL assumption is for the at least one dynamic CORESET from an active transmission configuration (TCI) state with a TCI state identifier (ID) applicable to a PDCCH in an active bandwidth part (BWP) of the second CC.

20. A method for wireless communications by a network entity, comprising:
    transmitting to a user equipment (UE) at least one downlink control information (DCI), of a first physical downlink control channel (PDCCH), that schedules at least one dynamic control resource set (CORESET); and
    transmitting a second PDCCH in the at least one dynamic CORESET, wherein the UE is to apply at least one quasi-co-located (QCL) assumption for a physical downlink shared channel (PDSCH) for the at least one dynamic CORESET if one or more conditions are met.

21. The method of claim 20, wherein the one or more conditions comprise the network entity signaling the UE an indication the UE is to apply the at least one quasi-co-located (QCL) assumption associated with the PDSCH for the at least one dynamic CORESET.

22. The method of claim 21, wherein the indication is conveyed via at least one of a radio resource control (RRC) reconfiguration message or in the at least one DCI that schedules the at least one dynamic CORESET.

23. The method of claim 21, wherein the indication is implicit if the network entity does not configure transmission configuration information (TCI) states for the at least one dynamic CORESET.

24. The method of claim 20, wherein the one or more conditions comprise:
the PDSCH and the at least one dynamic CORESET are co-scheduled by the same at least one DCI;
the at least one DCI of the first PDCCH has a transmission configuration information (TCI) field for the PDSCH; and
a time offset between the at least one DCI and the at least one dynamic CORESET is greater than or equal to a time duration for applying the at least one QCL assumption.

25. The method of claim 24, wherein the network entity transmits the second PDCCH assuming the UE is configured to receive the at least one dynamic CORESET assuming a TCI state for PDCCH demodulation reference signals (DMRS) indicated by the TCI field.

26. The method of claim 24, wherein the one or more conditions comprise the co-scheduled PDSCH and the at least one dynamic CORESET overlap fully or partially in time.

27. The method of claim 24, wherein, in case at least two TCI states are indicated for the PDSCH, the UE uses the same TCI state for the at least one dynamic CORESET and PDSCH.

28. The method of claim 27, wherein:
if the at least two TCI states are configured for a time division multiplexed scheme and the co-scheduled PDSCH and the at least one dynamic CORESET overlap fully or partially in time, the UE uses one of the TCI states used for an overlapping portion of the PDSCH.

29. An apparatus for wireless communication by a user equipment (UE), comprising:
a memory; and
at least one processor coupled to the memory, the memory and the at least one processor being configured to:
receive at least one downlink control information (DCI), of a first physical downlink control channel (PDCCH), that schedules at least one dynamic control resource set (CORESET); and
receive a second PDCCH in the at least one dynamic CORESET, wherein the UE is to apply at least one quasi-co-located (QCL) assumption associated with a physical downlink shared channel (PDSCH) for the at least one dynamic CORESET if one or more conditions are met.

30. An apparatus for wireless communication by a network entity, comprising:
a memory; and
at least one processor coupled to the memory, the memory and the at least one processor being configured to:
transmit a user equipment (UE) at least one downlink control information (DCI), of a first physical downlink control channel (PDCCH), that schedules at least one dynamic control resource set (CORESET); and
transmit a second PDCCH in the at least one dynamic CORESET, wherein the UE is to apply at least one quasi-co-located (QCL) assumption for a physical downlink shared channel (PDSCH) for the at least one dynamic CORESET if one or more conditions are met.

* * * * *